US 8,606,602 B2

(12) United States Patent
Prange

(10) Patent No.: US 8,606,602 B2
(45) Date of Patent: Dec. 10, 2013

(54) SYSTEMS AND METHODS FOR AUTOMATED TRANSACTIONS PROCESSING

(75) Inventor: Jurgen Prange, Zurich (CH)

(73) Assignee: Swiss Reinsurance Company Ltd., Zurich (CH)

( * ) Notice: Subject to any disclaimer, the term of this patent is extended or adjusted under 35 U.S.C. 154(b) by 1921 days.

(21) Appl. No.: 10/660,644

(22) Filed: Sep. 12, 2003

(65) Prior Publication Data
US 2005/0060204 A1 Mar. 17, 2005

(51) Int. Cl.
G06Q 40/00 (2012.01)
(52) U.S. Cl.
USPC ............................................................. 705/4
(58) Field of Classification Search
USPC ............................................................. 705/4
See application file for complete search history.

(56) References Cited

U.S. PATENT DOCUMENTS

| | | | |
|---|---|---|---|
| 5,191,522 A | 3/1993 | Bosco et al. | |
| 5,573,244 A | 11/1996 | Mindes | |
| 5,657,460 A | 8/1997 | Egan et al. | |
| 5,704,029 A | 12/1997 | Wright, Jr. | |
| 5,704,045 A * | 12/1997 | King et al. | 705/35 |
| 5,732,397 A | 3/1998 | DeTore et al. | |
| 5,752,236 A | 5/1998 | Sexton et al. | |
| 5,752,237 A | 5/1998 | Cherny | |
| 5,754,980 A | 5/1998 | Anderson et al. | |
| 5,758,126 A | 5/1998 | Daniels et al. | |
| 5,806,042 A | 9/1998 | Kelly et al. | |
| 5,832,465 A | 11/1998 | Tom | |
| 5,839,113 A | 11/1998 | Federau et al. | |
| 5,842,148 A | 11/1998 | Prendergast et al. | |
| 5,842,921 A | 12/1998 | Mindes et al. | |
| 5,852,808 A | 12/1998 | Cherny | |
| 5,873,066 A | 2/1999 | Underwood et al. | |
| 5,966,716 A | 10/1999 | Comer et al. | |
| 5,978,769 A | 11/1999 | Brown et al. | |
| 5,978,820 A | 11/1999 | Mase et al. | |
| 5,983,268 A | 11/1999 | Freivald et al. | |
| 5,991,733 A * | 11/1999 | Aleia et al. | 705/7.13 |
| 6,023,685 A | 2/2000 | Brett et al. | |
| 6,044,352 A * | 3/2000 | Deavers | 705/4 |
| 6,049,772 A | 4/2000 | Payne et al. | |

(Continued)

FOREIGN PATENT DOCUMENTS

| | | |
|---|---|---|
| CA | 2180995 | 1/1998 |
| EP | 0 918 424 | 5/1999 |

(Continued)

OTHER PUBLICATIONS

CATEX6—selected web pages "The Catastrophe Risk Exchange" 2001.*

(Continued)

Primary Examiner — Neal Sereboff
(74) Attorney, Agent, or Firm — Oblon, Spivak, McClelland, Maier & Neustadt, L.L.P.

(57) ABSTRACT

Systems and methods are disclosed for processing transactions between a customer and a business. An exemplary system includes a server used by the business and being accessible by the customer, and a customer account associated with the customer housed on the server. The customer account includes automated instructions that allow the customer to advise the business of an upcoming payment for an upcoming event, to request a payment from the business from a previous event, or to pair a payment with one or more upcoming events.

16 Claims, 24 Drawing Sheets

(56) References Cited

U.S. PATENT DOCUMENTS

| | | | |
|---|---|---|---|
| 6,049,773 A | 4/2000 | McCormack et al. | |
| 6,078,890 A | 6/2000 | Mangin et al. | |
| 6,084,585 A | 7/2000 | Kraft et al. | |
| 6,137,488 A | 10/2000 | Kraft et al. | |
| 6,321,212 B1 | 11/2001 | Lange | |
| 6,332,125 B1 | 12/2001 | Callen et al. | |
| 6,343,272 B1 | 1/2002 | Payne et al. | |
| 6,411,936 B1 | 6/2002 | Sanders | |
| 6,411,939 B1 | 6/2002 | Parsons | |
| 6,460,021 B1 | 10/2002 | Kirksey | |
| 6,526,386 B1 | 2/2003 | Chapman et al. | |
| 6,594,635 B1 | 7/2003 | Erlanger | |
| 6,604,080 B1 | 8/2003 | Kern | |
| 2001/0023414 A1* | 9/2001 | Kumar et al. | 705/35 |
| 2001/0027437 A1* | 10/2001 | Turbeville et al. | 705/38 |
| 2001/0028364 A1 | 10/2001 | Fredell et al. | |
| 2001/0037274 A1 | 11/2001 | Monticciolo | |
| 2001/0044734 A1 | 11/2001 | Walker et al. | |
| 2001/0047325 A1 | 11/2001 | Livingston | |
| 2001/0053986 A1 | 12/2001 | Dick | |
| 2001/0056396 A1* | 12/2001 | Goino | 705/37 |
| 2002/0002475 A1 | 1/2002 | Freedman et al. | |
| 2002/0004731 A1 | 1/2002 | Belben | |
| 2002/0029158 A1 | 3/2002 | Wolff et al. | |
| 2002/0032586 A1 | 3/2002 | Joao | |
| 2002/0032646 A1 | 3/2002 | Sweeney et al. | |
| 2002/0035489 A1 | 3/2002 | Herman et al. | |
| 2002/0035528 A1 | 3/2002 | Simpson et al. | |
| 2002/0042770 A1 | 4/2002 | Slyke et al. | |
| 2002/0046066 A1* | 4/2002 | Laurenzano | 705/4 |
| 2002/0046067 A1* | 4/2002 | Kraehenbuehl et al. | 705/4 |
| 2002/0049617 A1 | 4/2002 | Lencki et al. | |
| 2002/0069077 A1 | 6/2002 | Brophy et al. | |
| 2002/0069155 A1 | 6/2002 | Nafeh et al. | |
| 2002/0077866 A1 | 6/2002 | Javerlhac | |
| 2002/0077868 A1 | 6/2002 | Javerlhac | |
| 2002/0078046 A1 | 6/2002 | Uluakar et al. | |
| 2002/0082874 A1 | 6/2002 | Go | |
| 2002/0082875 A1 | 6/2002 | Best-Devereux | |
| 2002/0091553 A1 | 7/2002 | Callen et al. | |
| 2002/0091624 A1 | 7/2002 | Glodjo et al. | |
| 2002/0091991 A1 | 7/2002 | Castro | |
| 2002/0095317 A1 | 7/2002 | McCabe | |
| 2002/0099640 A1 | 7/2002 | Lange | |
| 2002/0111833 A1 | 8/2002 | Dick | |
| 2002/0116227 A1 | 8/2002 | Dick | |
| 2002/0120776 A1 | 8/2002 | Eggebraaten et al. | |
| 2002/0128877 A1* | 9/2002 | Levit | 705/4 |
| 2002/0138307 A1 | 9/2002 | Kramer | |
| 2002/0143583 A1 | 10/2002 | Reader et al. | |
| 2002/0143584 A1* | 10/2002 | Lundegren | 705/4 |
| 2002/0147670 A1 | 10/2002 | Lange | |
| 2002/0152098 A1 | 10/2002 | Evans et al. | |
| 2002/0156656 A1 | 10/2002 | Harrell et al. | |
| 2002/0156658 A1 | 10/2002 | Selesny et al. | |
| 2002/0156709 A1 | 10/2002 | Andrus et al. | |
| 2002/0169715 A1 | 11/2002 | Ruth et al. | |
| 2002/0174042 A1 | 11/2002 | Arena et al. | |
| 2002/0174046 A1 | 11/2002 | Mistretta | |
| 2002/0188540 A1 | 12/2002 | Fay et al. | |
| 2002/0194053 A1 | 12/2002 | Barrett et al. | |
| 2002/0194098 A1 | 12/2002 | Stiff et al. | |
| 2002/0194131 A1 | 12/2002 | Dick | |
| 2002/0198802 A1 | 12/2002 | Koresko | |
| 2003/0004759 A1 | 1/2003 | Chapman et al. | |
| 2003/0009355 A1 | 1/2003 | Gupta | |
| 2003/0009359 A1 | 1/2003 | Weidner et al. | |
| 2003/0014342 A1 | 1/2003 | Vande Pol | |
| 2003/0018497 A1 | 1/2003 | Luedtke | |
| 2003/0018576 A1 | 1/2003 | Zuckerbrot et al. | |
| 2003/0023544 A1 | 1/2003 | Chodes | |
| 2003/0028405 A1 | 2/2003 | Chapman et al. | |
| 2003/0028479 A1 | 2/2003 | Kirksey | |
| 2003/0046115 A1 | 3/2003 | Hisano | |
| 2003/0055778 A1 | 3/2003 | Erlanger | |
| 2003/0061075 A1 | 3/2003 | Heckman et al. | |
| 2003/0065540 A1 | 4/2003 | Callen et al. | |
| 2003/0074233 A1 | 4/2003 | Lee | |
| 2003/0074235 A1 | 4/2003 | Gregory | |
| 2003/0078815 A1 | 4/2003 | Parsons | |
| 2003/0078816 A1 | 4/2003 | Filep | |
| 2003/0083908 A1 | 5/2003 | Steinmann | |
| 2003/0083972 A1 | 5/2003 | Williams | |
| 2003/0083975 A1 | 5/2003 | O'Grady et al. | |
| 2003/0088430 A1 | 5/2003 | Ruark | |
| 2003/0115128 A1 | 6/2003 | Lange et al. | |
| 2003/0125108 A1 | 7/2003 | Groz | |
| 2003/0126155 A1 | 7/2003 | Parker et al. | |
| 2003/0130920 A1 | 7/2003 | Freund | |
| 2003/0135395 A1 | 7/2003 | Carfi et al. | |
| 2003/0144888 A1 | 7/2003 | Baron et al. | |
| 2003/0154094 A1 | 8/2003 | Bredemeier et al. | |
| 2003/0167220 A1 | 9/2003 | Schoen et al. | |
| 2003/0195776 A1 | 10/2003 | Moore et al. | |
| 2004/0225536 A1* | 11/2004 | Schoen et al. | 705/4 |
| 2005/0086156 A1* | 4/2005 | Conroy et al. | 705/38 |
| 2005/0102168 A1* | 5/2005 | Thomas et al. | 705/4 |

FOREIGN PATENT DOCUMENTS

| | | |
|---|---|---|
| EP | 0 955 595 | 11/1999 |
| EP | 1 115 075 | 11/2001 |
| WO | WO 00/54203 | 9/2000 |

OTHER PUBLICATIONS

CATEX brochure.*

"Questions of reinsurance. A short guide," produced by Swiss Re Publishing (1998), Swiss Reinsurance Company, Mythenquai 50/60, PO Box CH-8022 Zurich, Switzerland.

"Overview of Riskclick," http://www.riskclick.com.

"Reinsurance for the Third Milennium," http://marketing.rl3k.com.

"Inreon," http://www.Inreon.com.

"Smartfac," http://www.smartfac.com.

"Platform—eReinsure," http://www.ereinsure.com.

"Insurance and,Reinsurance Industry Business Methods and Software Intellectual Property Prior Art," Dec. 2001 (Lincoln National Reassurance Company).

"ManageReinsurance User Guide," version 1.1 (Dec. 5, 2001).

R. Grunig and P. Hall, "An introduction to rating casualty business," Swiss Reinsurance Company, Zurich (2000).

"An introduction to reinsurance," Swiss Reinsurance Company (1996).

Canadian Examiner's Report, May 21, 2003.

Canadian Examiner's Report, Feb. 18, 2004.

Jean Cora, "What's New in Cybertalk?;" Cybertalk (Oct. 2000), http://www.loma.org/cyboct00.asp.

"The Insurance Industry: The eCommerce Imperative Summary Report," Deloitte & Touche LLP (Jan. 2000); http://www.dttgfsi.com/publications/pdf_files/insurance.ecommerce.pdf.

* cited by examiner

FIGURE 5

My SwiftRe » Current Account

Current Account

🅷 Your Current Account as per 01/06/2001 14:15 CET
Client Name
Show entries that match the following criteria:

| Reinsurance Carrier: | Transaction Currency: | Status: |
|---|---|---|
| Swiss Re Zurich | USD - United States Dollar | All Postings |

Entry Date Between:
01/05/2001   – and –   01/06/2001

Note: Debit (Dr) = in your favour, Credit (Cr) = in SwiftRe.com's favour

| Entry Date | Description | Debit | Credit | Due Date | Value Date | Reminder Status |
|---|---|---|---|---|---|---|
|  | Opening Balance as of 01/05/2001 |  | 800.00 Cr |  |  |  |
| 03/05/2001 | Your Payment | 795.00 |  |  | 02/05/2001 | Paired |
| 03/05/2001 | Pairing Differences | 5.00 |  |  | 03/05/2001 | Paired |
| 11/05/2001 | Fac. Property 1st Quarter 01/01/2001 - 31/03/2001, Branch Zurich | 120.00 |  | 25/05/2001 |  | Rectified |
| 15/05/2001 | Fac. Property 1st Quarter 01/01/2001 - 31/03/2001, Branch Zurich |  | 120.00 | 29/05/2001 |  | Rectified |
| 15/05/2001 | Fac. Property 1st Quarter 01/01/2001 - 31/03/2001, Branch Zurich | 180.00 |  | 25/05/2001 |  | Overdue |
| 16/05/2001 | Fac. Liability 1st Quarter 01/01/2001 - 31.03.2001, Branch Hong Kong |  | 250.00 | 30/05/2001 |  | Payment in Transit |
| 31/05/2001 | Surplus Treaty B Cash Call Claim 456, Branch Zurich | 420.00 |  | 06/06/2001 |  | Payment in Transit |
| 01/06/2001 | Surplus Treaty D 1st Quarter 01/02/2001 - 30/04/2001, Branch Zurich | 100.00 |  | 15/06/2001 |  | Due |
|  | Balance Due | 460.00 Dr |  |  |  |  |
| 26/05/2001 | Your Payment Advice | 250.00 |  |  | 01/06/2001 | Payment in Transit |
| 31/05/2001 | Your Payment Request |  | 420.00 |  | 03/06/2001 | Payment in Transit |
|  | Balance Preview (including advised payments) | 280.00 Dr |  |  |  |  |
| 31/05/2001 | Surplus Treaty B Cash Call Contra Entry Claim 456, Branch Zurich |  | 420.00 | 03/06/2001 |  | Future Due |

Advice Payment | Pairing Advice | Receive Payment

| YOUR PAYMENT ADVICE in: USD - United States Dollar | | | | Date: 31/08/2001 |
|---|---|---|---|---|
| Client Name | | | Reinsurance Carrier: Swiss Re Zurich | |

Note: Debit (Dr) = in your favour, Credit (Cr) = in SwiftRe.com's favour

| Entry Date Description | Debit | Credit | Due Date | Status |
|---|---|---|---|---|
| 10/06/2001 ## REINS ## Fire Fac. | | 500.00 | 10/08/2001 | Overdue |
| Total : | | 500.00 | | |

Payment Notes:
- Expected Value Date: 31/08/2001
- We kindly ask you to remit above-mentioned Total amount to the following bank account of Swiss Re Zurich
- Please quote our Reference:

[Go Back] [Submit Payment Advice]

| YOUR PAYMENT ADVICE in: USD - United States Dollar | | | | | Date: 31/08/2003 |
|---|---|---|---|---|---|
| Client Name | | | | Reinsurance Carrier: Swiss Re Zurich | |

Note: Debit (Dr) = in your favour, Credit (Cr) = in SwiftRe.com's favour

| Entry Date | Description | Debit | Credit | Due Date | Value Date | Status |
|---|---|---|---|---|---|---|
| 04/02/2003 | Statement of Accounts, ## REINS ##, Fac. proportional, Property, Accounting Period 01/10/2002-31/12/2002 | | 160'000.00 | 18/02/2003 | | Overdue |
| 01/05/2003 | Statement of Accounts, ## REINS ##, Fac. proportional, Property, Accounting Period 01/01/2003-31/03/2003 | | 40'000.00 | 15/05/2003 | | Overdue |
| 26/05/2003 | Your Payment | 119'999.00 | | | 20/05/2003 | Unpaired. |
| Total : | | | 1.00 | | | |

In order to avoid transaction costs SwiftRe.com offers you to waive the displayed debt due.
Please press button "Set-off Without Payment".

If you do not wish to offset without payment, please remit above-mentioned Total amount to the following bank account of Swiss Re Zurich:

- Expected Value Date: 04/09/2003
- Please quote our Reference:

[Go Back] [Set-off Without Payment] [Submit Payment Advice]

| YOUR PAYMENT ADVICE in: USD - United States Dollar | | | | Date: 31/08/2001 | |
|---|---|---|---|---|---|
| Client Name | | | | Reinsurance Carrier: Swiss Re Zurich | |

Note: Debit (Dr) = in your favour, Credit (Cr) = in SwiftRe.com's favour

| Entry Date | Description | Debit | Credit | Due Date | Value Date | Status |
|---|---|---|---|---|---|---|
| 04/02/2001 | Statement of Accounts, ## REINS ##, Fac. proportional, Property, Accounting Period 01/10/2000-31/12/2000 | | 150'000.00 | 18/02/2001 | | Overdue |
| 01/05/2001 | Statement of Accounts, ## REINS ##, Fac. proportional, Property, Accounting Period 01/01/2001-31/03/2001 | 40'000.00 | | 15/05/2001 | | Overdue |
| 26/05/2001 | Your Payment | | 110'000.00 | | 20/04/2001 | Unpaired |
| Total | : | | 0.00 | | | |

SwiftRe.com offers you to match the displayed Debit and Credit items.
As a sign of your agreement please press button "Set-off Without Payment".

FIGURE 12

YOUR PAYMENT REQUEST in: USD - US Dollar — Date: 31/08/2001

Client Name:                                     Reinsurance Carrier: Swiss Re Zurich Note: Debit (Dr) = in your favour, Credit (Cr) = in SwiftRe's favour

| Entry Date | Description | Debit | Credit | Due Date | Status | Request |
|---|---|---|---|---|---|---|
| 10/06/2001 | ## REINS ##: Fire Fac. | | 1'000.00 | 10/08/2001 | Overdue | ✓ |
| 10/08/2001 | ## REINS ##: Fire 1st Surplus 2nd Qu. 2001 | 500.00 | | 24/08/2001 | Overdue | ✓ |
| 26/08/2001 | ## REINS ##: Fire 2nd Surplus 2nd Qu. 2001 | 11'000.00 | | 10/09/2001 | Due | ✓ |
| Total: | | 10'500.00 | | | | |

FIGURE 16

YOUR PAYMENT REQUEST in: USD - US Dollar — Date: 31/08/2001

Client Name:                                       Reinsurance Carrier: Swiss Re Zurich ⚠ A payment request requires at least one selected Debit item.

Note: Debit (Dr) = in your favour, Credit (Cr) = in SwiftRe's favour

| Entry Date | Description | Debit | Credit | Due Date | Status | Request |
|---|---|---|---|---|---|---|
| 10/06/2001 | ## REINS ##: Fire Fac. Period 01/01/2001-31/03/2001 | | 1'000.00 | 10/08/2001 | Overdue | ✓ |
| 10/08/2001 | ## REINS ##: Fire 1st Surplus 2nd Qu. 2001 | 500.00 | | 24/08/2001 | Overdue | ☐ ▼ |
| 26/08/2001 | ## REINS ##: Fire 2nd Surplus 2nd Qu. 2001 | 11'000.00 | | 10/09/2001 | Due | ☐ ▼ |
| Total: | | | 1'000.00 | | | |

FIGURE 17

YOUR PAYMENT REQUEST in: USD - US Dollar — Date: 31/08/2001

Client Name:                                       Reinsurance Carrier: Swiss Re Zurich ⚠ Unexpected balance. The Total of your selection is NOT in your favour. How do you want to proceed? Change your selection or instead submit a Payment Advice.

Note: Debit (Dr) = in your favour, Credit (Cr) = in SwiftRe's favour

| Entry Date | Description | Debit | Credit | Due Date | Status | Request |
|---|---|---|---|---|---|---|
| 10/06/2001 | ## REINS ##: Fire Fac. | | 1'000.00 | 10/08/2001 | Overdue | ✓ |
| 10/08/2001 | ## REINS ##: Fire 1st Surplus 2nd Qu. 2001 | 500.00 | | 24/08/2001 | Overdue | ✓ |
| 26/08/2001 | ## REINS ##: Fire 2nd Surplus 2nd Qu. 2001 | 11'000.00 | | 10/09/2001 | Due | ☐ |
| Total: | | | 500.00 | | | |

YOUR PAYMENT REQUEST in: USD, United States Dollar      Date: 31/08/2001

Client Name      Reinsurance Carrier: Swiss Re Zurich

Note: Debit (Dr) = in your favour, Credit (Cr) = in SwiftRe.com's favour

Mandatory Input

| Entry Date Description | Debit | Credit | Due Date | Status |
|---|---|---|---|---|
| 10/05/2001 ## REINS ## Fire Fac. | | 1'000.00 | 10/08/2001 | Overdue |
| 10/08/2001 ## REINS ## Fire 1st Surplus 2nd Qu. 2001 | 500.00 | | 24/08/2001 | Overdue |
| 26/08/2001 ## REINS ## Fire 2nd Surplus 2nd Qu. 2001 | 11'000.00 | | 10/09/2001 | Due |
| Total | 10'500.00 | | | |

Please enter a reference text below.      SwiftRe.com to remit the requested amount to:*
SwiftRe.com will quote it in the payment transaction      ⦿ USD, Swissbank AG, New York, Account
Reference:      ○ USD, Swissbank AG, New York, Account
SwiftRe [                    ]

[Go Back] [Set-off without payment] [Submit Payment]

| YOUR PAIRING ADVICE in: USD – United States Dollar | | | | | Date: 21/07/2001 |
|---|---|---|---|---|---|
| Client Name | | | | Reinsurance Carrier: Swiss Re Zurich | |
| Note: Debit (Dr) = in your favour, Credit (Cr) = in SwiftRe.com's favour | | | | | |
| Unpaired Payments | | | | | |
| Entry Date | Description | Debit | Credit | Value Date | Status |
| 15/06/2001 | Your Payment | 350.00 | | 14/06/2001 | Unpaired |
| 16/07/2001 | Your Payment | 310.00 | | 17/07/2001 | Unpaired |
| 19/07/2001 | Your Payment | 350.00 | | 18/07/2001 | Unpaired |
| Total | | 1'010.00 | | | |

| Your Proposed Allocation | | | | | | |
|---|---|---|---|---|---|---|
| Please indicate by using the checkboxes in the "Allocate" column which open item(s) to match with the above payments. | | | | | | |
| Entry Date | Description | Debit | Credit | Due Date | Status | Allocate |
| 10/06/2001 | ### REINS ### Fire Fac. | | 500.00 | 24/06/2001 | Overdue | ☐ |
| 16/06/2001 | ### REINS ### Fire 1st Surplus 2nd Qu. 2001 | 1'000.00 | | 30/06/2001 | Overdue | ☐ |
| 06/07/2001 | ### REINS ### Fire 2nd Surplus 2nd Qu. 2001 | | 11'000.00 | 22/07/2001 | Due | ☐ |
| Total | | | 0.00 | | | |

YOUR PAIRING ADVICE in: USD - United States Dollar      Date: 21/07/2001

Client Name      Reinsurance Carrier: Swiss Re Zurich

Note: Debit (Dr) = in your favour, Credit (Cr) = in SwiftRe.com's favour

| Entry Date | Description | Debit | Credit | Due Date | Status |
|---|---|---|---|---|---|
| 10/06/2001 | ## REINS ## Fire Fac. | | 500.00 | 24/06/2001 | Overdue |
| Total | : | | 500.00 | | |

For settlement of the above Total SwiftRe.com proposes to allocate the unpaired payments as follows:
The payment(s) checked in the "Full" column will be used at 100%; the payment marked "Partial" if any will cover the remaining part of the above Total. You may change this proposal.

| Entry Date | Description | Debit | Credit | Value Date | Full | Partial | |
|---|---|---|---|---|---|---|---|
| 15/06/2001 | Your Payment | 350.00 | | 14/06/2001 | ☑ | ☐ | 350.00 |
| 19/07/2001 | Your Payment | 310.00 | | 17/07/2001 | ☐ | ☑ | 150.00 |
| 19/07/2001 | Your Payment | 350.00 | | 18/07/2001 | ☐ | ☐ | 0.00 |
| Total | : | | | | | | 500.00 |

YOUR PAIRING ADVICE in: USD - United States Dollar      Date: 21/07/2001

Client Name      Reinsurance Carrier: Swiss Re Zurich

Note: Debit (Dr) = in your favour, Credit (Cr) = in SwiftRe.com's favour

| Entry Date | Description | Debit | Credit | Due Date | Status |
|---|---|---|---|---|---|
| 10/06/2001 | ## REINS ## Fire Fac. | | 1'015.00 | 24/06/2001 | Overdue |
| Total | : | | 1'015.00 | | |

For settlement of the above Total SwiftRe.com proposes to allocate the unpaired payments as follows:
The payment(s) checked in the "Full" column will be used at 100%. SwiftRe.com will write off the Pairing Difference amount.

| Entry Date | Description | Debit | Credit | Value Date | Full | Partial | |
|---|---|---|---|---|---|---|---|
| 15/06/2001 | Your Payment | 350.00 | | 14/06/2001 | ☑ | ☐ | 350.00 |
| 19/07/2001 | Your Payment | 310.00 | | 17/07/2001 | ☑ | ☐ | 310.00 |
| 19/07/2001 | Your Payment | 350.00 | | 18/07/2001 | ☑ | ☐ | 350.00 |
| 21/07/2001 | Pairing Differences | 5.00 | | 21/07/2001 | | | 5.00 |
| Total | : | | | | | | 1'015.00 |

| YOUR PAIRING ADVICE in: USD - United States Dollar | | | | | Date: 21/07/2001 |
|---|---|---|---|---|---|
| Client Name | | | | Reinsurance Carrier: Swiss Re Zurich | |
| Many thanks for your Pairing Advice. If you agree with the allocation below please press "Submit". Afterwards your Pairing Advice will be processed. However, it may not be visible on your Current Account immediately. Please do not enter the same Pairing Advice twice. | | | | | |

Note: Debit (Dr) = in your favour, Credit (Cr) = in SwiftRe.com's favour

| Entry Date | Description | Debit | Credit | Due Date | Status |
|---|---|---|---|---|---|
| 10/06/2001 | REINS ## Fire Fac. | | 500.00 | 24/06/2001 | Overdue |
| Total | : | | 500.00 | | |

The unpaired payments will be allocated as follows:

| Entry Date | Description | Debit | Credit | Value Date | Full | Partial | |
|---|---|---|---|---|---|---|---|
| 18/07/2001 | Your Payment | 310.00 | | 17/07/2001 | ✓ | ☐ | 310.00 |
| 19/07/2001 | Your Payment | 350.00 | | 18/07/2001 | ☐ | ✓ | 190.00 |
| Total | | | | | | | 500.00 |

| YOUR PAYMENT REQUEST in: USD - United States Dollar   Date: 31.08.2001 |||||
|---|---|---|---|---|
| CLIENT NAME |||||
| Note: Debit = in your favour, Credit = in SwiftRe.com's favour |||||
| Entry Date | Description | Debit | Credit | Due Date |
| 10.06.2001 | ## REINS ##: Fire Fac. | | 500.00 | 10.08.2001 |
| 10.08.2001 | ## REINS ##: Fire 1st Surplus 2nd Qu. 2001 | 1,000.00 | | 24.08.2001 |
| 26.08.2001 | ## REINS ##: Fire 2nd Surplus 2nd Qu. 2001 | 11,000.00 | | 10.09.2001 |
| | TOTAL: | 11,500.00 | | |

Status: Payment in Transit

Payment Notes:

- Execution Date: 02.09.2001
- Reference.
- SwiftRe.com is going to remit the amount to:
  Swissbank AG, New York, Account

[ « Go Back ]

FIGURE 29

![Figure 30 screenshot of Payment Advice]
FIGURE 30
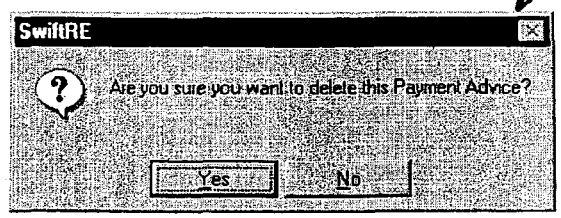
FIGURE 31
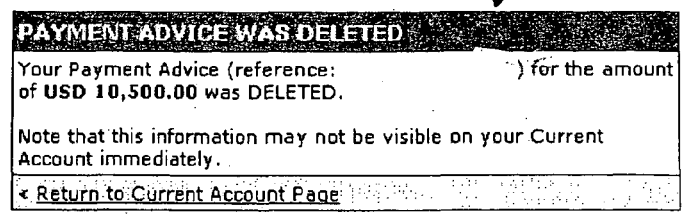
FIGURE 32

```
                                                             ← 3300
┌─────────────────────────────────────────────────────────────────┐
│ PAYMENT INFORMATION                                             │
├─────────────────────────────────────────────────────────────────┤
│ CLIENT NAME (Payer)                                             │
│                                                                 │
│ SwiftRe.com Reference Number: BISPAYID                          │
│ Your Reference: PPREF                                           │
│                                                                 │
│ Payment Currency       Amount*    Value Date    Status          │
│ CHF                    1'220.00   02.05.2001    Partially Paired│
│                                                                 │
│ * Converted at rate of exchange 0.6516 to USD 795.00            │
│                                                                 │
├─────────────────────────────────────────────────────────────────┤
│              [ < Go Back ]  [ Pairing Information ]             │
└─────────────────────────────────────────────────────────────────┘
```

FIGURE 33

```
                                                             ← 3400
┌─────────────────────────────────────────────────────────────────┐
│ PAYMENT INFORMATION                                             │
├─────────────────────────────────────────────────────────────────┤
│ CLIENT NAME (Payee)                                             │
│                                                                 │
│ SwiftRe.com Reference Number: BISPAYID                          │
│ Reference Text : PPREF                                          │
│                                                                 │
│ Payment Currency       Amount     Value Date    Status          │
│ USD                    500.00     12.02.2001    Paired          │
│                                                                 │
├─────────────────────────────────────────────────────────────────┤
│              [ < Go Back ]  [ Pairing Information ]             │
└─────────────────────────────────────────────────────────────────┘
```

SYSTEMS AND METHODS FOR AUTOMATED TRANSACTIONS PROCESSING

BACKGROUND

1. Field of the Invention

The present invention relates to systems and methods for automated transactions processing. More particularly, the present invention relates to automated systems and methods for receiving orders and processing payments, while maintaining accounting of individual accounts.

2. Background of the Invention

Filing customer orders, invoicing customer bills, and processing customer payments are among the most common business processes. Yet these simple interactions continue to be the source of errors and inefficiencies and customer dissatisfaction. Thus, there remains a need to improve the accuracy and efficiency of transaction processing and improve customer-to-business communication, decrease costs, and minimize errors. Finding a suitable transaction processing approach depends to a very large extent on the nature of the customer business interaction.

A common business that handles a large number of customer requests is the insurance industry. Such businesses receive a large number of customer requests and therefore must handle a large number of transactions swiftly and efficiently. However, much error occurs in the interaction between a customer's claim for an incident and the insurance company's ultimate payment to settle the claim. Much overhead is required for the insurance company to handle each claim individually with persons that scrutinize the customer's claim for accuracy and reliability. Thus, insurance companies incur high costs related to the costs of overhead when each customer claim must be individually considered by a representative of the insurance company before any payment is made to the customer.

In a similar manner, a reinsurance company may have to consider a large number of claims by insurance companies relating to various contracts that the insurance company has with the reinsurance company as well as keeping track of premium payments owed by each insurance company. Although the reinsurance company-to-insurance company interaction is based on trust, it is often labor intensive because of the premium and claim handling. In contrast, the customer-to-insurance company interaction is not as manually intensive because at least the premium amounts are fixed and invoices can be sent automatically.

For example, when an insurance company presents a claim to the reinsurance company, the latter routinely prepares a payment to settle the claim, often without conducting the arduous tasks of considering the details of validity and reliability of the claim. The reinsurance company thereby "trusts" that the insurance company has presented a claim that conforms to the agreement between the two companies and does not unfairly or unreasonably affects the reinsurance company. Furthermore, any such payment to settle the insurance company's claim is typically delayed by the usual delays associated with the handling of the claim and preparation and transfer of the payment. Similarly, "trust" issues exist for handling premium payments from insurance companies to the reinsurance company.

Finally, the reinsurance company typically does not conduct a proper accounting of the claim(s) that the insurance company(ies) has presented in the sense that generally there is no allocation of payments, claims, or premiums to individual contracts, but rather only at the customer (insurance company) level. Thus, there is little assurance, other than a reliance on the insurance company, that a claim is within the metes and bounds of the contract between the two businesses, and that the policy limit has not been exceeded.

Thus, there are inefficiencies within the reinsurance company's routine of handling transactions with its customer and insurance companies. Such inefficiencies potentially lead to lost revenue and inaccurate or delayed accounting.

SUMMARY OF THE INVENTION

The present invention, as described in the exemplary embodiments presented herein, addresses the shortcomings of the efficiencies and inaccuracies that typically occur between two or more parties to a business transaction. Such parties may include individuals, businesses, agencies, or governments. The examples presented throughout this disclosure are directed to interactions between a reinsurance company and its customer, an insurance company. However, this example is merely presented for simplicity and is not intended to be limiting to the present invention.

In one exemplary embodiment of the present invention, a system is disclosed for transacting business between a customer and a business. The system includes a server used by the business and being accessible by the customer, and a customer account hosted on the server. The customer account includes automated instructions that allow the customer to direct the business to make an upcoming payment for an upcoming event, to request a payment from the business from a previous event, or to pair a payment with one or more upcoming events.

In another exemplary embodiment of the present invention, a system is disclosed for transacting business between a customer and a business. The system includes a server used by the business and being accessible by the customer, and a customer account hosted on the server. The customer account includes means for instructing the business to make an upcoming payment for an upcoming event, to request a payment from the business from a previous event, or to pair a payment with one or more upcoming events.

In yet another exemplary embodiment of the present invention, a method is disclosed for transacting business between a customer and a business. The method includes accessing a customer account on a server used by the business, and instructing the business to make an upcoming payment for an upcoming event, to request a payment from the business from a previous event, or to pair a payment with one or more upcoming events.

BRIEF DESCRIPTION OF THE DRAWINGS

FIGS. 5-36 are exemplary screenshots that can be used in the exemplary processes and systems described in FIGS. 1-4 above.

DETAILED DESCRIPTION OF PREFERRED EMBODIMENTS

Exemplary systems and methods according to the present invention utilize a universal interface between a customer and a business to facilitate transactions between the customer and the business. The exemplary systems and methods presented herein decrease the time and labor associated with conventional claims-processing routines, resulting in decreased costs and increased efficiency in transactions between the parties. Although the exemplary embodiments described herein are made with reference to the reinsurance industry as an example, the invention is not limited to this type of business. Other types of businesses can benefit from the exemplary systems and methods described herein. For example, insurance corporations, government agencies, and other entities that distribute funds or licenses, or other similar businesses or organizations may benefit from the systems and methods described herein, with expected modifications, apparent to one having skill in the art, to conform to the specific organization.

As described above, the reinsurance industry, for example, is characterized by a relatively high level of trust between the reinsurers and their customers (insurance companies). In addition, there are typically a large volume of transactions between each customer and the reinsurer, i.e., one-time customers are rare. These characteristics of the reinsurance business create opportunities for improvement in transaction processing.

Because of the relatively high level of trust between the reinsurers and their customers (insurance companies), it is practical to allow customers access to internal account records. In this way, customers can review records and provide input (e.g., payment advice or requests for payment) to improve accuracy and efficiency. Of course, there must be a user interface that facilitates such customer interaction. In addition, because there are typically a large volume of transactions between each customer and the reinsurer, it is possible to improve transaction processing by pairing and offsetting debits and credits.

Figure 1:
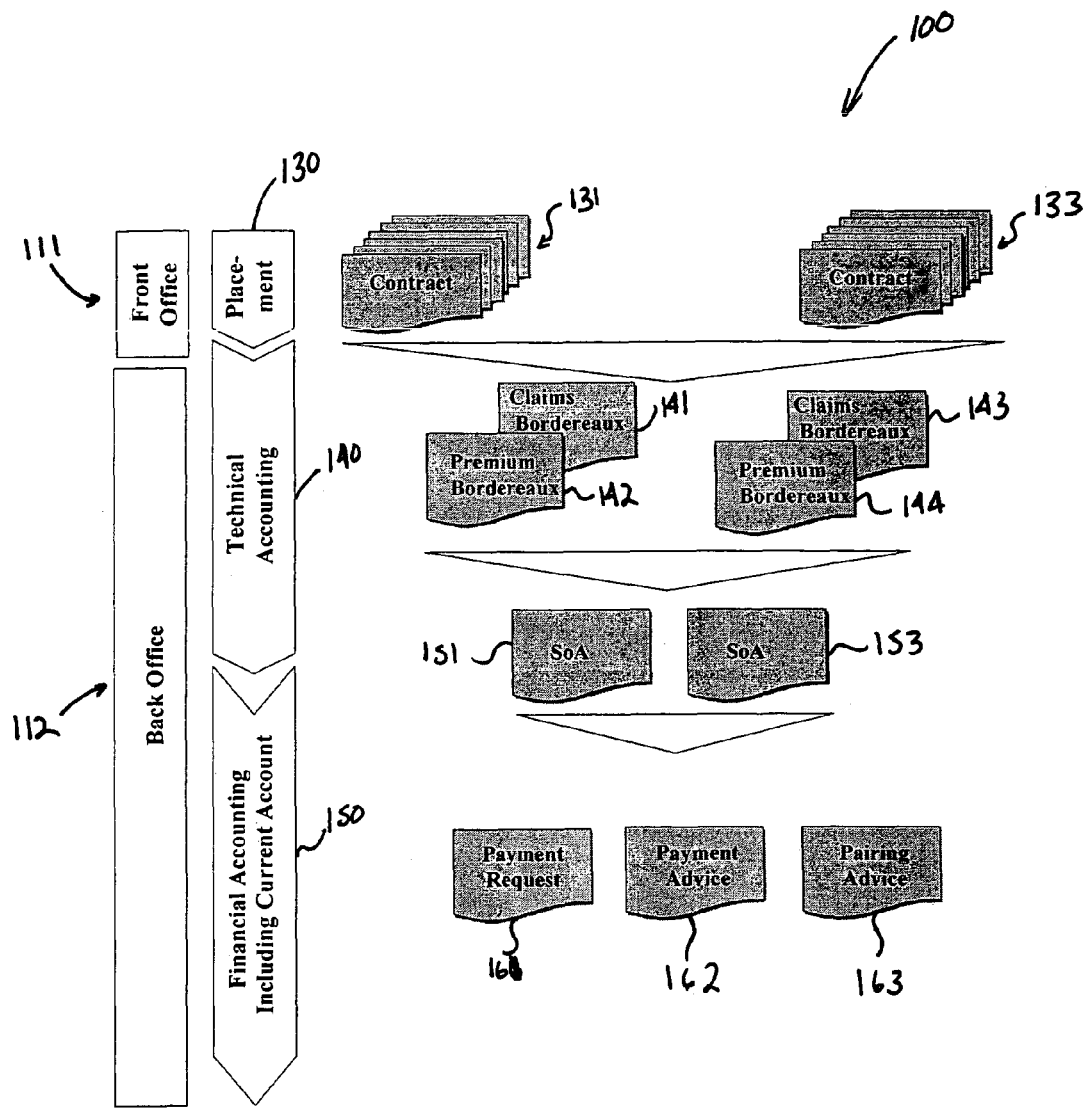
FIG. 1 shows an overview of an exemplary process of an embodiment of the invention for receiving claims and distributing funds within a reinsurance business.

In the insurance-reinsurance context, a process for receiving and handling customer claims is shown in FIG. 1. System 100 includes a front office portion 111 and a back office portion 112. Although the front office portion 111 and back office portion 112 are shown having certain functions, such functions may be shifted accordingly such that each office portion 111 or 112 may have more or fewer functions than is shown in FIG. 1.

Front office portion 111 is primarily involved in the function of placement 130. Generally, placement 130 involves negotiation between a customer (e.g., an insurance company) and a business (e.g., a reinsurer) to distribute risk. The end result of the negotiation is typically a contract or treaty or modification to an existing contract or treaty. Several bundles of contracts 131 and 133 are obtained in this front office portion 111 function. Each of the bundles of contracts 131 and 133 may share one or more characteristics. Such acceptances 131 and 133 may include, for example, policies of the same line of business, currency, types of reinsurance, reinsured or the like. Each bundle may include as few as a single contract and as many as several 1000 contracts. Other types or organizations of the bundles are also possible.

After the placement 130, the process proceeds to a series of back office portion 112 functions, including a technical accounting component 140 and a financial accounting component 150. In the technical accounting component 140, the acceptances 131 and 133 lead to two claims bordereaux 141 and 143, and premiums bordereaux 142 and 144, respectively. Generally, bordereaux are lists of all premiums or claims movements during a certain accounting period for a specified bundle of contracts. The totals are posted in the financial accounting component 150, which also includes current account. All detailed movements are posted in the technical accounting component 140.

The two Bordereaux then become the basis for one statement of accounts 151 or 153, respectively, per agreed accounting period. Such period could be, for example, monthly, quarterly, or other determinable time period. The one or more statement of accounts 151 and 153 then lead to a financial accounting 150 function, which includes current account. Current account allows a customer to perform one or more financial transactions such as, for example, a payment request 161, a payment advice 162, or a pairing advice 163. Each of these transactions will be described in more detail below. Other financial transactions are also possible. In addition, from current account, it is possible to view a payment request already submitted, to view and/or to delete a payment advice, to view payment, and to view pairing information.

Referring to the functional aspects of the system and method shown in FIG. 1, the current account or financial accounting 150 functionality is the last step in the reinsurance value chain that is visible to a customer. Furthermore, typically one current account exists per customer and contains all the balances of technical reinsurance bookings (e.g., statements of accounts 151 or 153), cash call related bookings, payment bookings and information about matching/pairing status. A cash call is an advance payment the insurance company may request from the reinsurer in case of a large claim settlement. The amount will be debited in the next regular statement of accounts.

Figure 2:
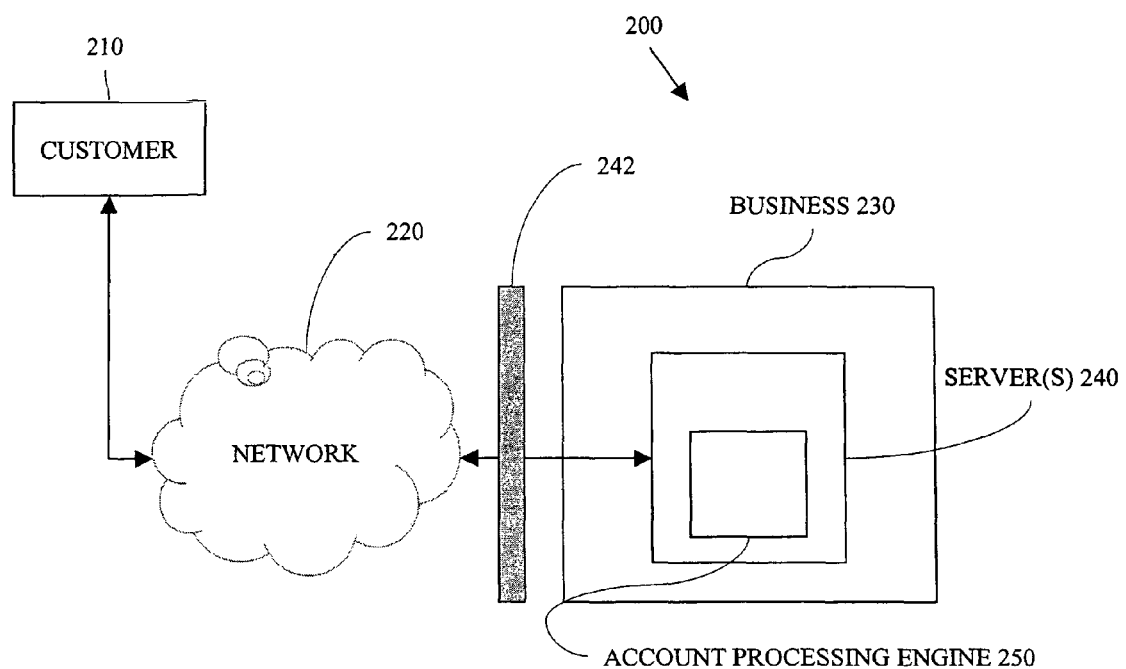
FIG. 2 is a schematic diagram showing an exemplary system of the invention.

FIG. 2 is a schematic diagram showing an exemplary system of the invention. System 200 of the invention includes server 240 and account processing engine 250. Server 240 can include one server or a network of servers. Server 240 is associated with business 230. For example, server 240 can be owned, operated, or otherwise maintained by or on behalf of business 230. Server 240 is associated with account processing engine 250. Account processing engine 250 is associated with a processor that is configured to execute processes and methods in accordance with the present invention as described herein. For example, application processing engine 250 may execute various processes called for by current account.

Server 240 is accessible to one or more customers 210 over network 220. Firewall 242 of server 240 is provided to prevent unauthorized access to server 240. The use of firewall 242 is well known in the art and it is therefore not described in detail herein.

Customer 210 and business 230 can communicate with each other via network 220. Network 220 can be any known communications network. Preferably, network 220 is the Internet. In the context of the reinsurance industry, customer 210 is an insurance company that sells insurance policies to insured parties. Business 230 is a reinsurer that deals with customer 210 in provision of reinsurance services associated with the insurance policies of customer 210.

For example, when customer 210 (e.g., an insurance company) provides business 230 with a payment advice that includes input data, the input data flows through application modules associated with server 240. For convenience, the process associated with the applications modules is hereinafter referred to as the "current account" process.

The request is first validated technically to ensure that the input data provided by customer 210 fits the minimum data quality requirements. The data quality requirements can include, for example, correct syntax, each value of the input data is within a predefined (context-less) range, basic relationships between values in the request are correct (e.g., DATE1 is before DATE2), and so on.

Next, modules/functions associated with server 240 can concentrate on business validation rules for several processes within current account. For example, the processes may include payment advice, payment request, pairing advice. The business validation rules can restrict a customer's freedom towards a desired data range and helps to standardize the processes. Filter rules or "business checks" may also be provided to determine afterwards whether manual intervention by the business is needed.

The systems and methods of the present invention are designed to be user-friendly and readily accessible to a customer with minimal manual intervention by a business utilizing such systems and/or methods. Thus, a non-limiting means of providing access to the systems and/or methods of the present invention is through the Internet. A customer may readily access the customer's account through the Internet at any time and from any place in the world that allows Internet access. Such access may either be provided through hardwire means or remotely. This increased flexibility and lack of restraint with respect to time and place for account access provides a tremendous benefit to the customer. Likewise, such flexibility offered to the customer provides the business with an increased customer base of those who are attracted to such flexibility.

A customer may access a system according to the present invention by, for example, typing a specific Internet address that enables access to the customer's account. Typically, a login page may be used to ensure secured access to the customer account, and to prevent unauthorized or fraudulent use of the customer account. Once a customer logs into the customer account properly, a menu-drive homepage may be provided, with various option pages, such as that shown as exemplary screenshot 300 in FIG. 3. Although screenshot 300 is shown having particular features and traits, other screenshots, such as screenshot 500 shown in FIG. 5 and screenshot 600 shown in FIG. 6 are within the purview and scope of the present invention, which is not limited to the screenshot shown in FIG. 3.

Figure 3:
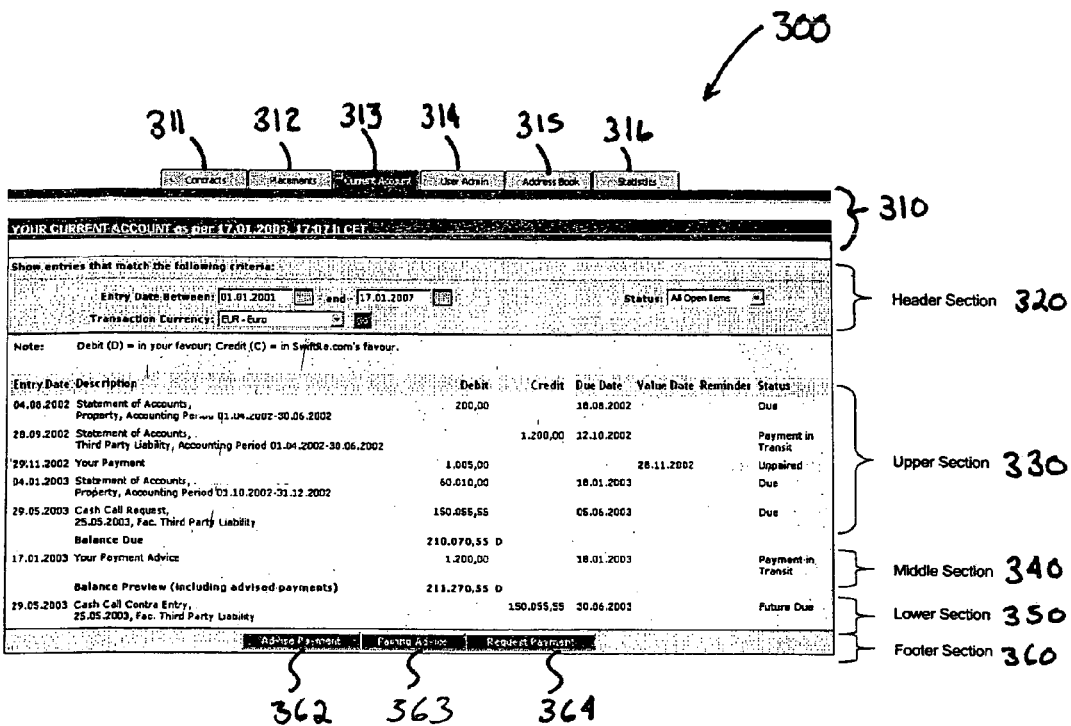
FIG. 3 is a screenshot showing a model current account summary according to an embodiment of the present invention.

Exemplary screenshot 300 is shown having a number of menu items 310. Each menu item contains a separate screen of features and options for the customer. The exemplary menu item shown in FIG. 3 is current account 313. Other menu options include, but are not limited to, contracts 311, placements 312, user administration 314, address book 315, and statistics 316. Contracts 311 is intended for viewing details of bound contracts and accessing the premiums/claims bordereaux. Placement 312 is the negotiation area where insurance and reinsurance company submit offers, counter-offers, and accept or decline. In user administration 314, the insurance company can administer its customer account (i.e., users passwords, users access rights, company address, and company bank accounts). Address book 315 may be used for registering email accounts of other (competing) reinsurers should the client wish to forward offers to other reinsurance companies as well. In statistics 316 the insurance company may generate and view online reports on its book of business and its transactions with the reinsurer. The current account 313 is shown in FIG. 3 as an example and is not intended to be limiting of the invention or the types of screenshots that are available.

Within the current account 313 shown in FIG. 3, a number of further options are provided to the customer that facilitate the customer's access and functional capacities. Header section 320 provides readily accessible parameters that the customer may change to access part or all of the customer account. Some of the options that may be changed in the header section include, but are not limited to, entry dates for analysis, transaction currency, and status of various account postings. Header section 320 can also filter the current account by group company information, posting date, status of booking, and currency. Other options, such as, filtering by reinsurer if more than one reinsurer is associated with the application, are possible.

Other sections of the screenshot 300 of current account 313 are optionally available depending on the particular customer account and whether there are applicable items within each section. For example, upper section 330 may include, but is not limited to, particular items that have been entered into the system by the customer. Such items could include matter descriptions, relevant dates, and value amounts. Upper section 330 further contains all of the selected bookings. These bookings could include, but are not limited to, balances of confirmed statement of accounts 151 or 153 and their rectifications, payments (in or out) and cash call requests/regulations. The total of all bookings may be shown on the line "Balance Due," which is either a credit (in favor of the reinsurance company) or a debit (in favor of the customer). A detailed view may also be presented via a hyperlink, by pointing and clicking on the text of the bookings.

Middle section 340 contains payments in transit or in the approval process. The sum of these bookings and the Balance Due form the Balance Preview.

Lower section 350 includes matters that are to be considered to be due or payable in the near future. Such "future due" bookings are pro memoria (e.g., cash call contra entries).

Finally, a footer section 360 includes a button option set that allows a customer to trigger a financial transaction. Such functional keys enable the customer to request specific functions from the system that are processed automatically without manual intervention. Such functions include, but are not limited to, payment advice 362, payment request 364 or pairing advice 363, as will be described in more detail below. Other optional functions are possible, such as, for example, the customer doing an online reconciliation of his current account with the displayed postings, storing comments to individual postings, and scheduling alarms for future actions.

Systems and processes according to the present invention automate accounting processes that have typically required time-consuming and inefficient manual handling. Further, they also improve efficiencies in other transaction areas. Such other areas include, but are not limited to, data exchange between customer and company (e.g., reinsurer), validation and plausibility checks, confirmation about the status of a transaction and changes of status. Other areas may also receive benefits from the current invention.

Access to a customer's current account offers several kinds of functionality including, but not limited to, the ability of the customer to view and filter online (anytime, anywhere) all of the bookings in the system. The customer also has the ability to interact and trigger a financial transaction, depending on the credit/debit balance position. Access allows the customer full transparency of postings and enables him to reconcile his own accounts without involving personnel of the business. Other functionalities are also apparent to one having ordinary skill in the art.

Figure 4:
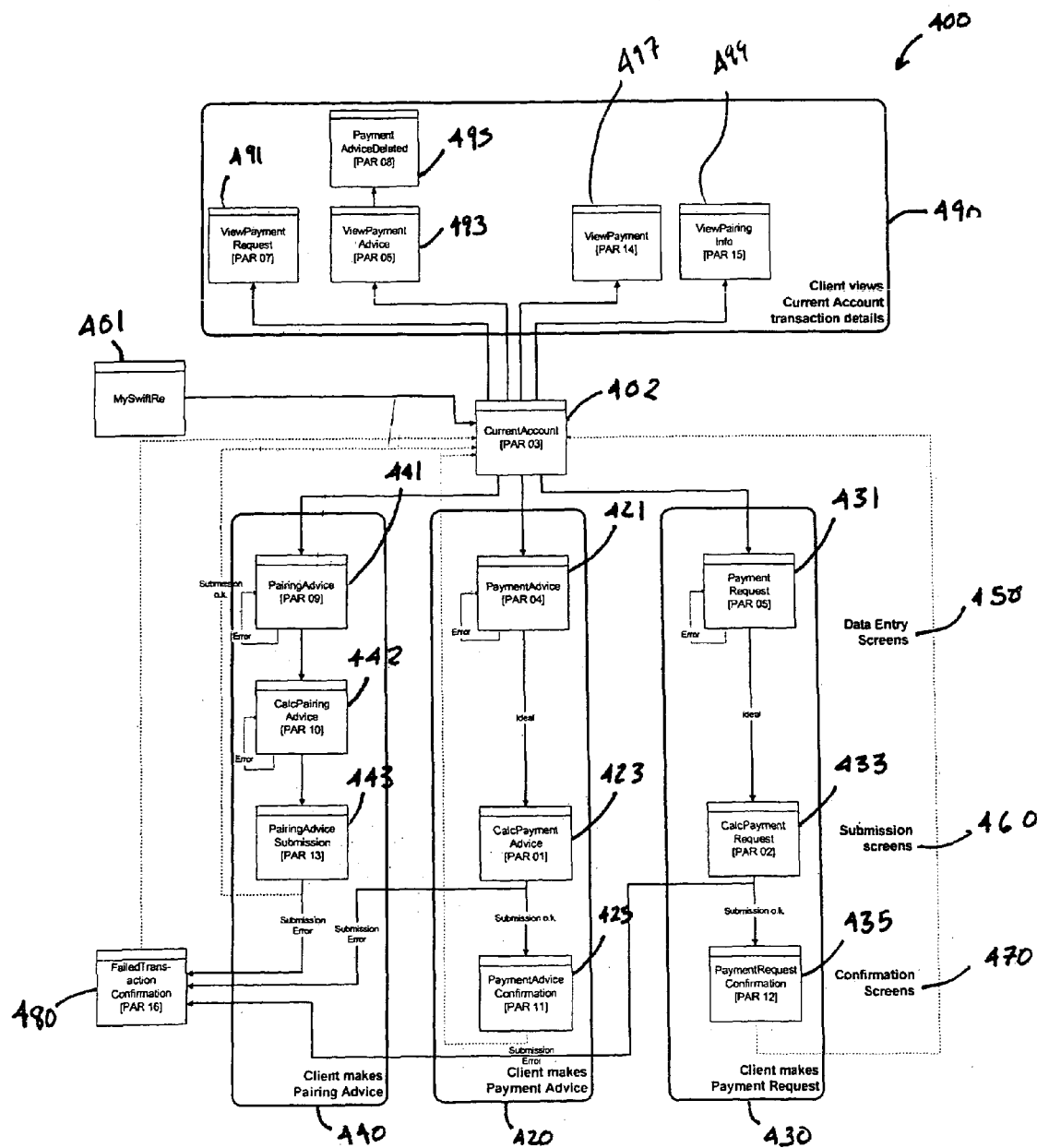
FIG. 4 is a block diagram showing an exemplary embodiment of the present invention that shows a sequence of events that enables a customer to receive automated payments and account information when interacting with a reinsurance company.

FIG. 4 shows an exemplary map 400 relating to the viewing and transaction processes. Map 400 is merely an example of the viewing and transaction procedures, and the current invention is not limited to this specific example. Other examples and procedures serving a similar, function and having similar capabilities are within the purview and scope of the present invention. Map 400 includes several vertical columns that describe some of the functionalities of the exemplary system shown and several horizontal rows that describe data at various stages through the system.

A customer may interact with information on the business's servers by logging into the system interface 401. The system interface may be via a web page maintained by the business on the Internet. The business may provide secure access by requiring a customer to login to the system using, for example, a user name and password.

Figure 5:
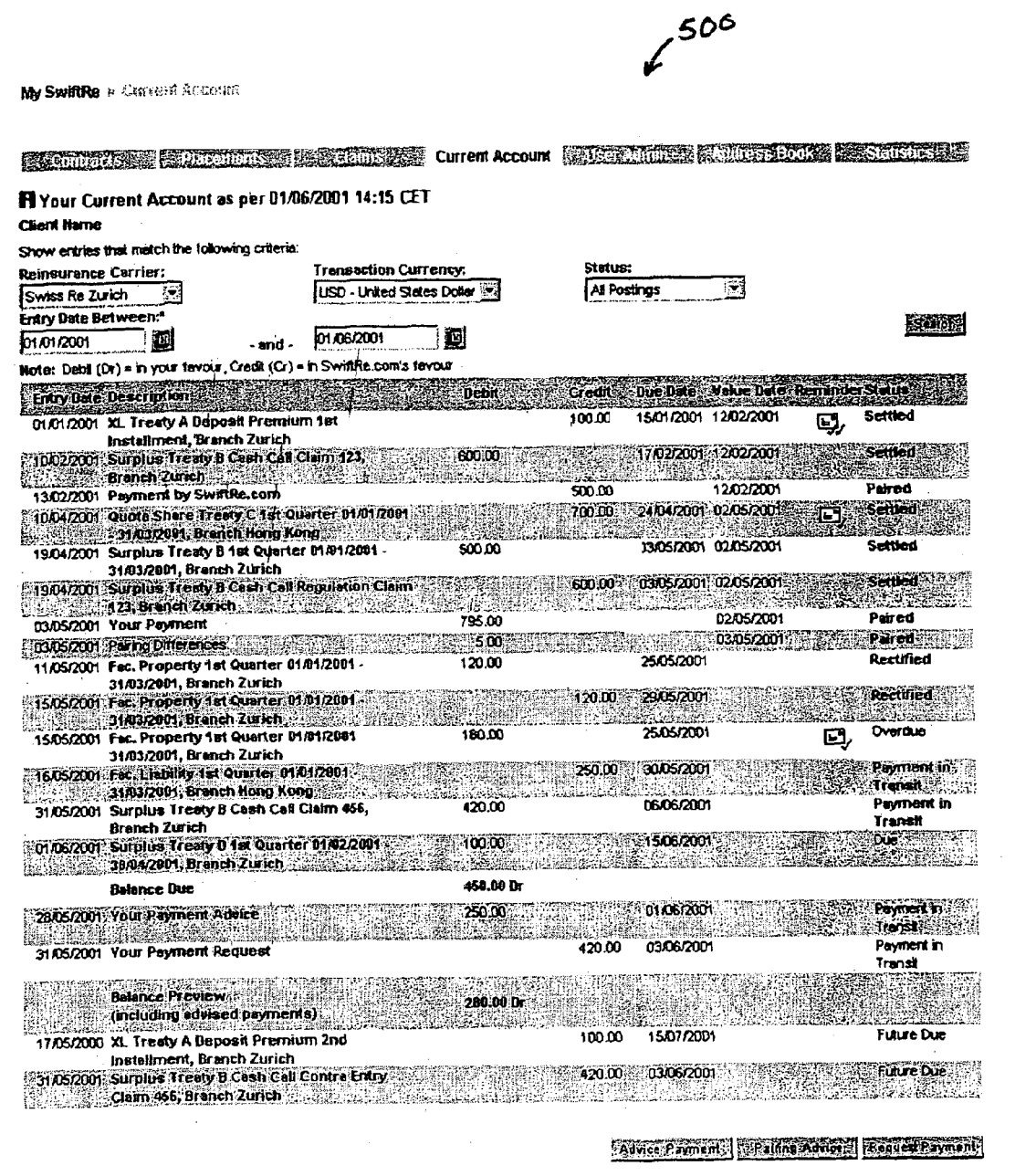

A customer may view bookings at any time while accessing the system online. Such viewing may be in general by viewing all available bookings and balances, or more specific by viewing each individual booking detail by hyperlink. FIGS. 5 and 6 show screenshots 500 and 600 respectively. FIG. 5 is an exemplary screenshot 500 of current account showing all bookings and balances for the specified period of time. This period of time does not have to extend through the present so the customer can see the status of his accounts for any period of time available. FIG. 6 is an exemplary screenshot 600 of current account where the screen has been filtered to show an opening balance as of a specified date and all remaining balances.

Figures 7, 8, 9:
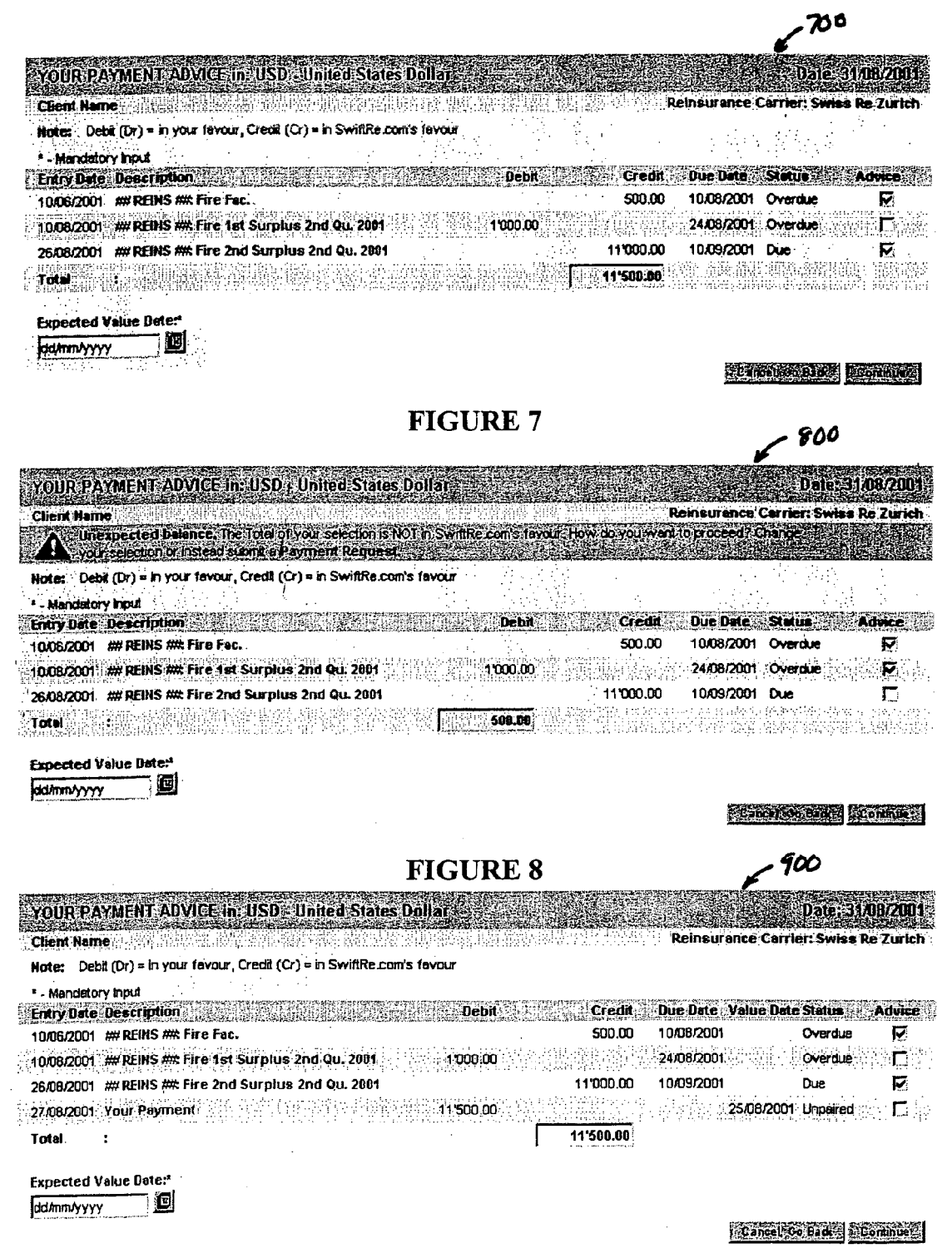

When a customer chooses the advise payment option (e.g., selects advise payment 362 from screenshot 300) when viewing the current account 402, shown in FIG. 4, the system proceeds to the advise payment column 420, wherein the customer advises the business of an upcoming payment which can be paired with one or previous events. The customer does not need to pair the upcoming payment with any previous events. At the data entry portion 450 of the advise payment option, payment advice portion 421 is initiated. At this stage, the system presents a list of all open (e.g., unsettled) current account bookings as seen in the exemplary screenshot 700 of FIG. 7. The customer then selects the open items the customer would like to settle by submitting payment. In the exemplary screenshot 700, the customer has selected open items with a $500 credit and an $11,000 credit for a total balance of $11,500.

The system verifies that the sum of all selected postings is in the system's favor and that the advised value date lies within a predefined limit before continuing. For example, as seen in screenshot 800 of FIG. 8, the customer has selected two open items, a $500 credit and a $1000 debit for a total balance of a $500 debit, which is not in the systems favor. When such a situation occurs, the system suggests submitting a payment request or changing the selections. If, however, the amount is in the system's favor, then the customer is asked to input an expected value date. For example, as seen in screenshot 900, the customer has entered an expected value date of Aug. 27, 2001. In the ideal scenario (i.e., the total favors the business) the total is a credit and the system proceeds to calculate payment advice process 423 in the data submission screen portion 460.

When the system proceeds to calculate payment advice process 423, the system presents the preferred business bank account depending on, for example, payment currency and the customer's country. Furthermore, a unique reference number is generated that the customer is asked to quote in the payment order. FIG. 10 is a screenshot 1000 displaying the expected value date, bank account number, and unique reference number. This reference number is later used to recognize the actual payment and to pair it in an automated fashion with the technical bookings. The customer then submits the payment advise information by clicking on the submit payment advice button. If there is only a relatively small amount of money due (e.g., below a predetermined amount), the customer may choose a set-off without payment.

FIG. 11 is a screenshot 1100 showing the option of setting-off without payment. In this exemplary scenario, there is a total payment of $1.00. In order to minimize cost a business may offer to set-off without payment (i.e., forego payment). A business may set this amount to any particular amount, such as, for example $20.00. The customer can always elect to make the payment; therefore, screenshot 1100 provides the same information regarding expected value date, bank account number, and unique reference number.

If the total amount equals zero, then the business may offer to match the selected debit and credit items. FIG. 12 shows screenshot 1200 where the total payment is zero. In this situation, the submit payment advice button is not available because there is no physical payment or bank routing necessary. Therefore, in the exemplary screenshot, the customer may be directed to select the set-off without payment button as a sign of acceptance.

Figure 13:
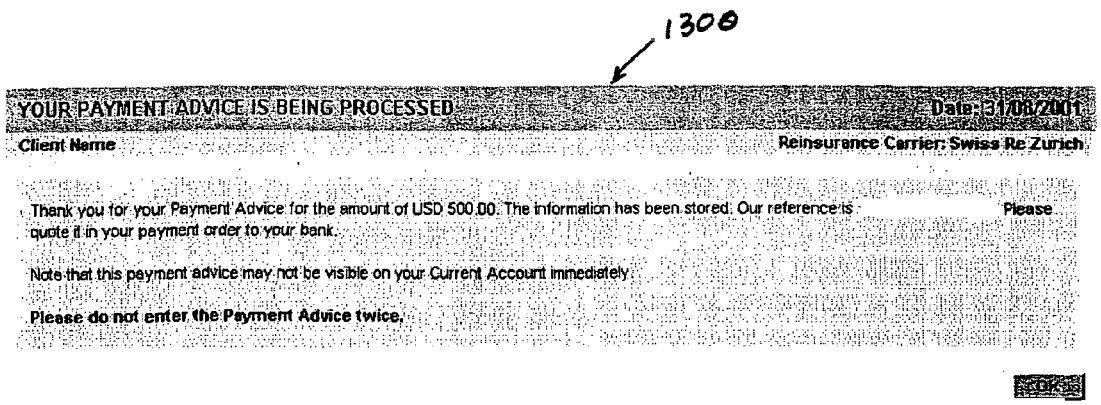
Figure 14:
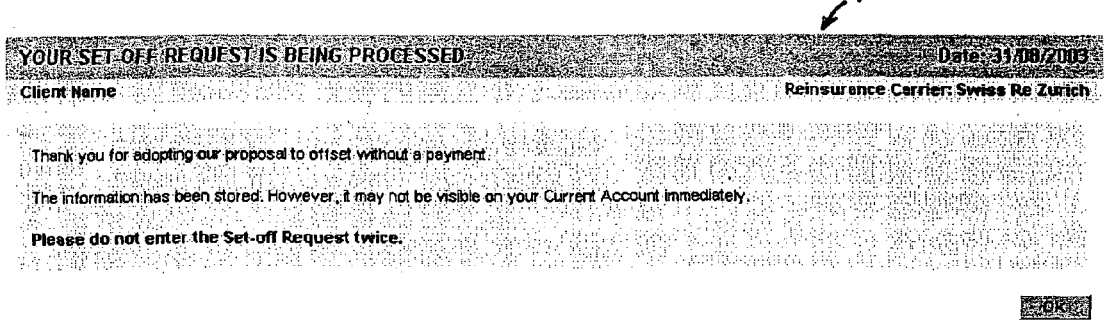

If the submission from calculate payment advice process 423 is proper, the system proceeds to payment advice confirmation process 425 in the confirmation screens portion 470. Here, the customer receives a message confirming the successful booking of the payment advice or set-off request. Exemplary screenshot 1300 shown in FIG. 13 is an example confirming the successful booking of the payment advice, while exemplary screenshot 1400 shown in FIG. 14 is an example confirming the set-off without payment. Once the payment advice confirmation process 425 is complete and the customer has acknowledged it, the system returns to the current account 402. After returning to the current account 402, the customer may automatically ascertain the effects of the just-implemented payment advise.

If, however, an error occurs due to technical problems while trying to complete the calculate payment advice process 423, the system proceeds to the failed transaction confirmation process 480. Exemplary screenshot 1500 shown in FIG. 15 advises the customer that the transaction has failed and request the customer to try again later. If the problem continues to occur the customer is encouraged to contact the business. After the customer acknowledges this screen, the system returns to current account 402 where the customer may perform any other tasks.

When a customer chooses the request payment option (e.g., selects request payment 364 from screenshot 300) under the current account 402, the system proceeds to the request payment column 430, wherein the customer requests a payment from the business for a previous event. At the data entry portion 450 of the request payment option, payment advice process 431 is initiated. The business presents a list of all open (e.g., unsettled) current account bookings to the customer as seen in the exemplary screenshot 1600 of FIG. 16. The customer selects which of the open items are to be settled by requesting a payment from the business. In screenshot 1600, the customer has selected open items with a $500 debit, an $11,000 debit, and a $1000.00 credit for a total balance of $10,500.

The system then verifies that the sum of all selected postings is in the customer's favor before continuing. For example, as seen in screenshot 1700 of FIG. 17, the customer has selected only a $1000 credit and no debit amount. Another example shown in screenshot 1800 of FIG. 18, a $1000 credit and a $500 debit for a total balance of a $500 credit, which is not in the customer's favor. When such a situation occurs, the system suggests submitting a payment advice or changing the selections. Yet another example shown in screenshot 1900, another error has occurred. In the ideal scenario (i.e., the total favors the customer) the total is a debit and the system proceeds to calculate payment request process 433 in the submission screen portion 460.

When the system continues to the calculate payment request process 433, the business lists some or all of the customer's bank accounts in payment currency as known by the business. The customer then selects the bank account to which the payment should be remitted. Furthermore, the customer can enter a reference text for easy recognition by the customer once the money has been transferred to the customer's designated destination. FIG. 20 is an exemplary screenshot 2000 displaying list of customer's bank accounts, place for the customer to enter the reference text, and several buttons. From this screen the customer can choose to submit payment request or to set-off without payment. If there is only a relatively small amount (e.g., less than a predetermined amount) that the business owes the customer, the customer may be asked to agree to a set-off without payment (i.e., forego payment). The system then verifies that all data entry has been entered correctly, and then proceeds to the next process.

Figure 21:
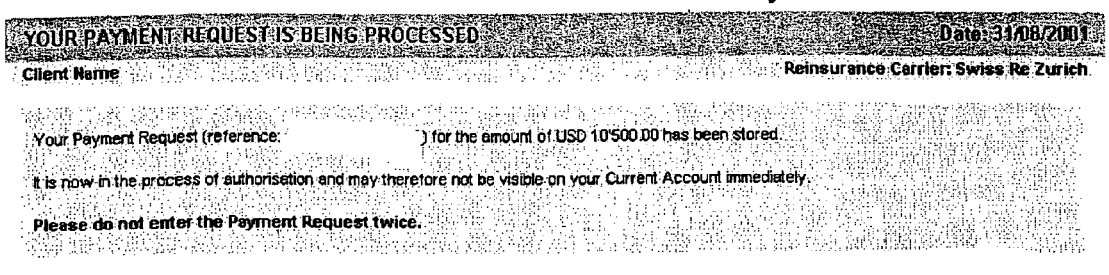
Figure 22:
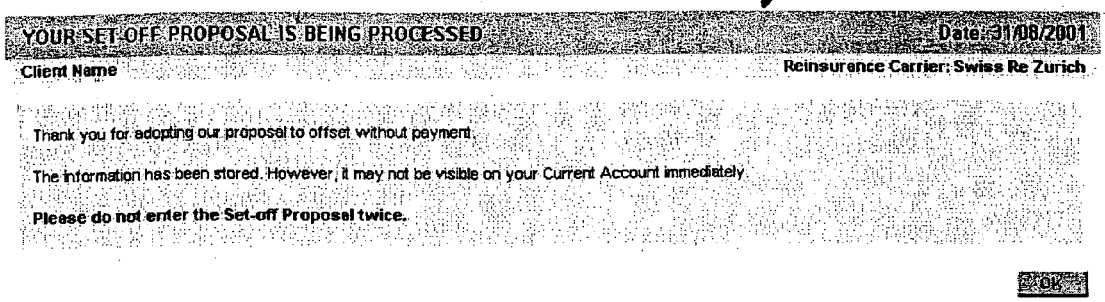

If the submission from calculate payment request process 433 is proper, the system proceeds to payment request confirmation process 435 in the confirmation screens portion 470. Here, the customer receives a message confirming the successful booking of the payment request or set-off request. Exemplary screenshot 2100 shown in FIG. 21 is an example confirming the successful booking of the payment request, while exemplary screenshot 2200 shown in FIG. 22 is an example confirming the set-off without payment. Once the payment request confirmation process 435 is complete and the customer has acknowledged it, the system returns to the current account 402. After returning to the current account 402, the customer may automatically ascertain the effects of the just-implemented payment request. The payment request may then be further reviewed by one or more authorized parties (e.g., accountants of the business) before the actual payment is authorized. Such payment may be processed through, for example, payment order to a local operational data store, and from there via an electronic network to the customer's bank.

Figure 15:
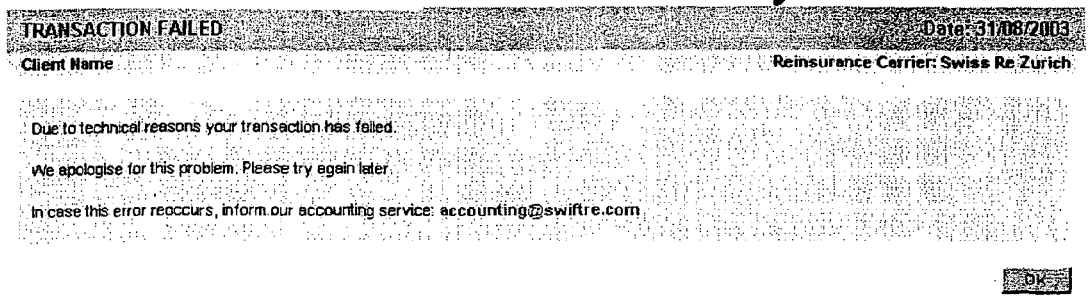

If, however, an error occurs due to technical problems while trying to complete the calculate payment request process 433, the system proceeds to the failed transaction confirmation 480 process and screenshot 1500, as shown in FIG. 15, will be displayed.

If the customer chooses the pairing advice option (e.g., selects pairing advice 363 from screenshot 300) when viewing current account 402, shown in FIG. 4, the system proceeds to the pairing advice column 440, wherein the customer allocates specific payment(s) with specific technical bookings. At the data entry portion 450 of the pairing advice option, the pairing advice process 441 is initiated. The customer is requested to present pairing advice—technical bookings information. If the business is unable to pair a customer's payment to open current account bookings (e.g., due to non-use of payment advice functionality), the customer can do so manually using the pairing advice process. One or more lists of information may be presented to the customer, such lists including, but not limited to, unpaired payment bookings, unsettled (e.g., due or overdue) technical current account bookings (e.g., mainly statements of accounts), or the like, as seen in exemplary screenshot 2300 of FIG. 23. Other types of information may also be presented as lists. The customer then selects which of the open items shall be paired with particular payment(s) by allocating among the open items the ones that are to be matched. The system then first verifies that the sum of all selected technical postings plus an acceptable set-off amount is less than or equal to the total of unpaired payment bookings before proceeding.

If the system proceeds to the calculate pairing advice process 442 within the data entry screen portion 450, information relating to the pairing advice—payment bookings is requested. The system presents several lists including, but not limited to, technical current account bookings, as selected (e.g., on previous screen) by the customer for matching, all unpaired payments contained in the current account, or the like, as seen in exemplary screenshot 2400 of FIG. 24. Other lists are also possible. Furthermore, the system proposes how to pair or allocate the open payment bookings using, for example, a first-in first-out principle. In the exemplary screenshot 2400, the system has proposed matching a $350 debit and a $310 debit with a $500 credit. The customer may then instruct which and how much of the open payments shall be paired, either fully or partially. The system may be configured to allow only one partial selection. The system may then verify the input. In case of a small (e.g., predetermined amount) discrepancy between technical and payment bookings, the system proposes a write-off of the pairing difference, either by the business or the customer. Exemplary screenshot 2500 of FIG. 25 shows a scenario where the business is willing to write off the pairing difference amount.

Figure 26:
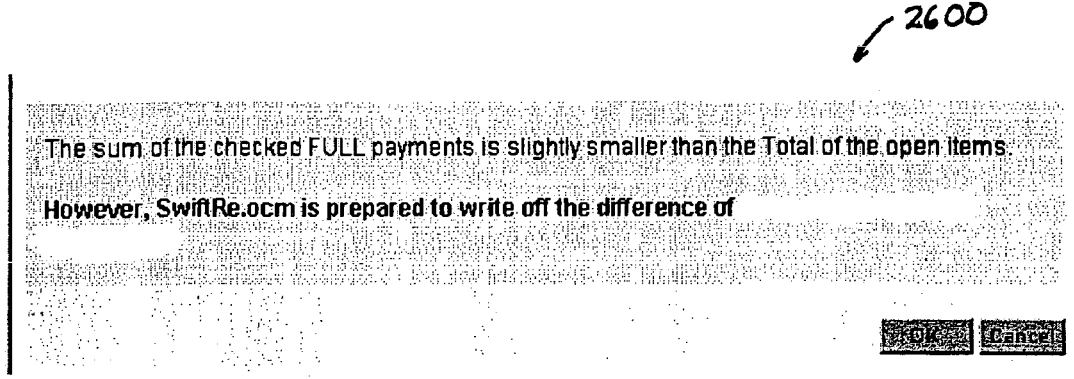
Figure 27:
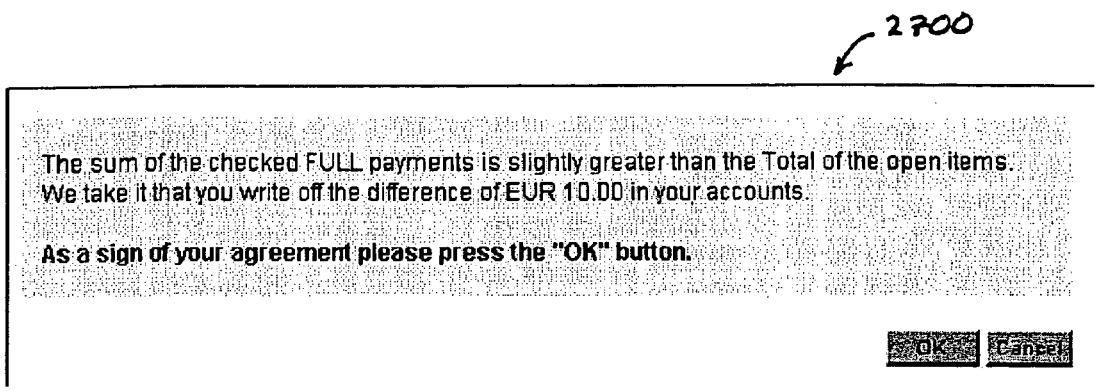

If the customer selects only full payments and there is a small discrepancy between the technical and payment bookings the system may present the customer with either exemplary screenshot 2600 of FIG. 26 or exemplary screenshot 2700 of FIG. 27. More specifically, screenshot 2600 shows the scenario where the business is willing to write off the difference because the checked full payments is slightly smaller than the total of the open item. Screenshot 2700 shows the scenario where the business asks the customer if he is willing to write off the difference because the checked full payments is slightly greater than the total of the open item. If the customer is not willing to accept the set-off the customer can go back and make different selections.

If the submission from calculate pairing advice process 442 is proper, the system proceeds to pairing advice submission process 443 in the submission screen portion 460. In this process, the business presents the customer with the result of the previous two processes for review. Exemplary screenshot 2800 of FIG. 28 shows a screen summarizing the proposed pairing. The customer can then conduct a final verification of the information before submitting the data.

If the data is submitted, the system processes the pairing advice and returns to current account 402 and has immediate access to the results of the just-performed pairing instructions. If there are any processing errors (e.g., technical), the system proceeds to the failed transaction confirmation process 480 and screenshot 1500, as shown in FIG. 15, will be displayed.

In addition to advising of a payment, requesting a payment, or making a payment from current account, it is possible to see details of existing payment advice, payment request, or pairing by selecting it from the screen. For example, a customer on screenshot 300 could select "Your Payment Advice" to review the details about the payment advice.

When a customer chooses to view a payment request (e.g., selecting the existing payment request) when viewing the current account 402, shown in FIG. 4, the system proceeds to the view payment request process 491 in the current account transaction details portion 490. The customer is presented with details of the payment request. Exemplary screenshot 2900 of FIG. 29 shows information about the payment request. In this exemplary embodiment, no further action is possible from this screen accept to return to current account.

When a customer chooses to view a payment advice (e.g., selecting the existing payment advice) when viewing the current account 402, shown in FIG. 4, the system proceeds to the view payment advice process 493 in the current account transaction details portion 490. The customer is presented with details of the payment advice along with the option of deleting the payment advice. Exemplary screenshot 3000 shows information about the payment advice. In this exemplary embodiment, the customer has an option to delete the payment advice. If the customer chooses to delete the payment advice, the system may first request confirmation as seen in screenshot 3100 of FIG. 31.

If the customer confirms the deletion of the payment advice, the system proceeds to delete payment advice process 495 in the current account transaction details portion 490. The system deletes the payment advice and presents confirmation that the payment was deleted. Exemplary screenshot 3200 of FIG. 32 advises the customer that the payment advice was deleted.

Figures 35, 36:
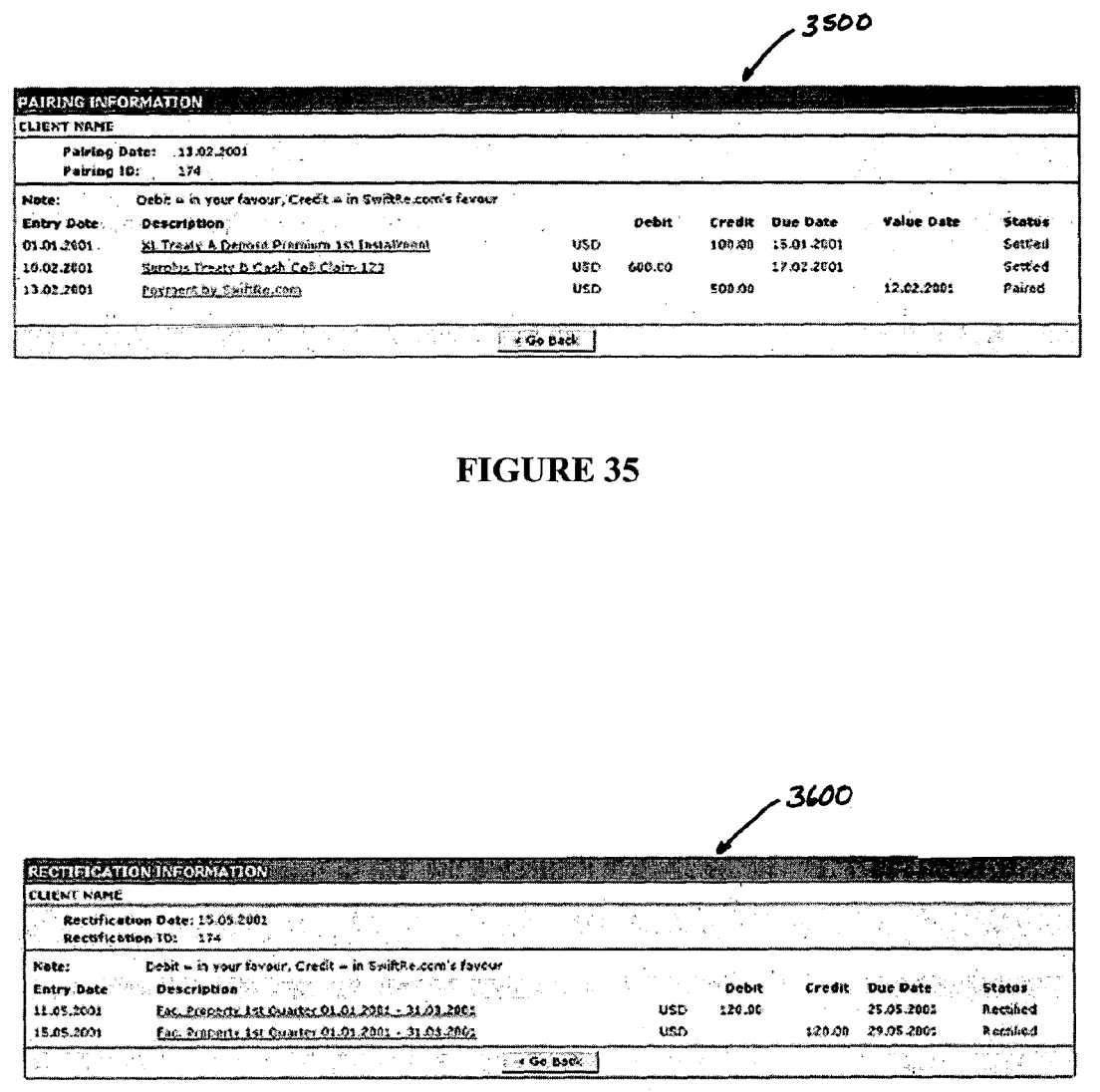

When a customer chooses to view pairing information while viewing the current account 402, shown in FIG. 4, the system proceeds to the view pairing information process 499 in the current account transaction details portion 490. The customer is presented with details of a pairing in screen shot 3500 of FIG. 35. The screen shot 3500 may display details about the pairing process and the customer can view details from the respective statement of accounts by clicking on one of the paired items. Screen shot 3600 of FIG. 36 shows rectification information as well where two statements of accounts have been rectified. If the pairing resulted in a partial pairing, the information is split into a "paired" portion and an "unpaired portion."

When a customer chooses to view a payment when viewing the current account 402, shown in FIG. 4, the system proceeds to the view payment process 497 in the current account transaction details portion 490. The customer is presented with details of either an incoming payment made by the customer in favor of the reinsurer, as seen in screen shot 3300 of FIG. 33, or an outgoing payment from the reinsurer in the favor of the customer, as seen in screen shot 3400 of FIG. 34. The payment screen can show the rate of exchange for the incoming or outgoing payment. If the payment is partially paired as shown in screen shot 3300, the customer is given an opportunity to viewing the pairing by clicking on the according button.

The current account system and processes described above can be used in a back office context.

Figure 37:
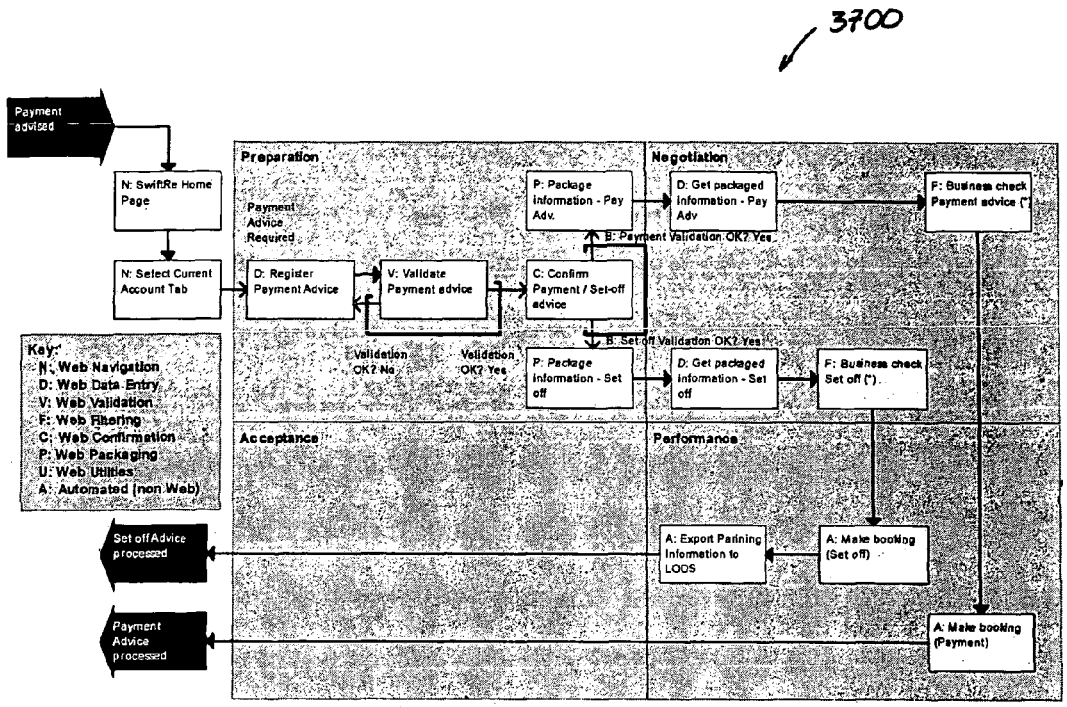
FIG. 37 shows an exemplary process through which a customer makes a payment advice to a business.

In the back office context, FIG. 37 shows an exemplary process 3700 through which a payment advice may be processed by the business in a preparation-negotiation-performance-acceptance (PNPA) model.

Once a customer has accessed current account through the business supported interface and selected advise payment, the system proceeds to the "Preparation" portion of the PNPA model. The system obtains the information provided by the customer regarding amount, expected value date, and which items to pay or set-off at "D: Register Payment Advice." The system validates the payment advice at "V: Validate payment advice" and if it is validated, the system seeks web confirmation at "C: Confirm Payment/Set-off advice." If not, the system indicates to the customer the nature of the error and await correction. Once the customer confirms the payment of set-off, the system proceed to either "P: Package Information—Pay Adv." or "P: Package Information—Set off" accordingly. The "P: Package Information—Pay Adv." contains information, such as, advised items, value date, total amount, reference number, and business bank account details. The "P: Package Information—Set off" includes information, such as, advised items and write off amount (if any).

During the "Negotiation" portion of the PNPA model, the system receives the package information at either "D: Get packaged information—Pay Adv." or "D: Get packaged information—Set off." The information may optionally go through several checks at "F: Business check Payment Advice." or "F: Business check Set off." Checks for payment advice may include late payments for minimum deposits. Checks for set-off may include determining that the customer is not bankrupt. These checks are merely exemplary and if no checks are provided the system passes the information to the "Performance" portion of the PNPA model.

At "Performance" the system either passes to "A: Make booking (Payment)" or "A: Make booking (Set off)." "A: Make booking (Payment)" causes the system to post a preliminary entry to current account and change the status of the selected open items to "payment in transit." "A: Make booking (Set-off)" causes the system to post DIFF booking and matching payments.

If the payment advice resulted in payment, the system indicates payment advice processed. If the payment advice resulted in a set-off, the system proceeds to "A: Export Pairing Information to LODS." From there the system indicates Set-Off advice processed.

Figure 38:
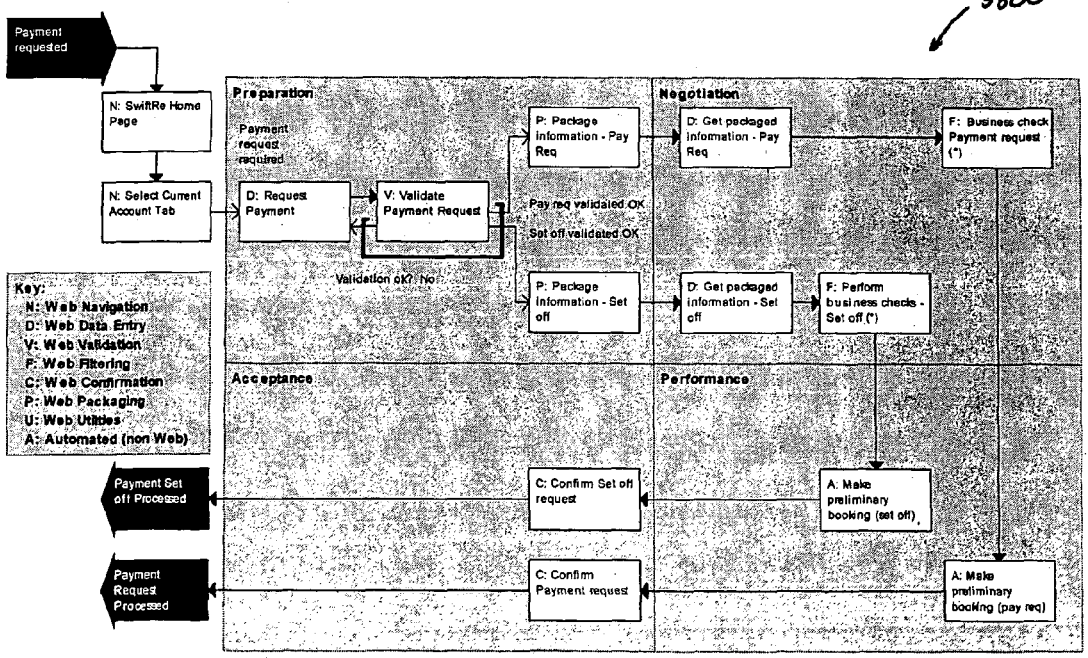
FIG. 38 shows an exemplary process through which a customer makes a pairing advice to a business.

In the back office context, FIG. 38 shows an exemplary process 3800 through which a payment request may be processed by the business in a PNPA model.

Once a customer has accessed current account through the business supported interface and selected payment request, the system proceeds to the "Preparation" portion of the PNPA model. The system obtains from the client the bookings in favor to client and may also include bookings in favor to the business if they are overdue, amount, currency, statement of account reference, clients bank account, and a unique identifier if entered by the client at "D: Request Payment." The system validates the payment request at "V: Validate Payment Request" and if it is validated, the system proceeds to either "P: Package information—Pay Req" or "P: Package Information—Set off" accordingly. The "P: Package Information—Pay Req." contains information, such as, advised items, total amount, reference number, and customer bank account details. The "P: Package Information—Set off" includes information, such as, advised items and write off amount (if any).

During the "Negotiation" portion of the PNPA model, the system receives the package information at either "D: Get packaged information—Pay Req." or "D: Get packaged information—Set off." The information may optionally go through several checks at "F: Business check Payment request." or "F: Business checks—Set off." Checks for payment advice may include late payments for minimum deposits. Checks for set-off may include determining that the customer is not bankrupt. These checks are merely exemplary and if no checks are provided the system passes the information to the "Performance" portion of the PNPA model.

At "Performance" the system proceeds to either "A: Make preliminary booking (pay req)" or "A: Make preliminary booking (set off)." "A: Make preliminary booking (pay req)" causes the system to post a preliminary entry to current account and change the status of the selected open items to "payment in transit." It also determines a payment due date in the future, for example, three days. "A: Make preliminary booking (setoff)" causes the system to make a preliminary booking.

After making the preliminary booking, the system seeks confirmation from the customer at either "C: Confirm Set off request" or "C: Confirm Payment request in the "Acceptance" portion of the PNPA model. Once the customer confirms, the system indicates either "Payment Set Off processed" or "Payment Request Processed."

Figure 39:
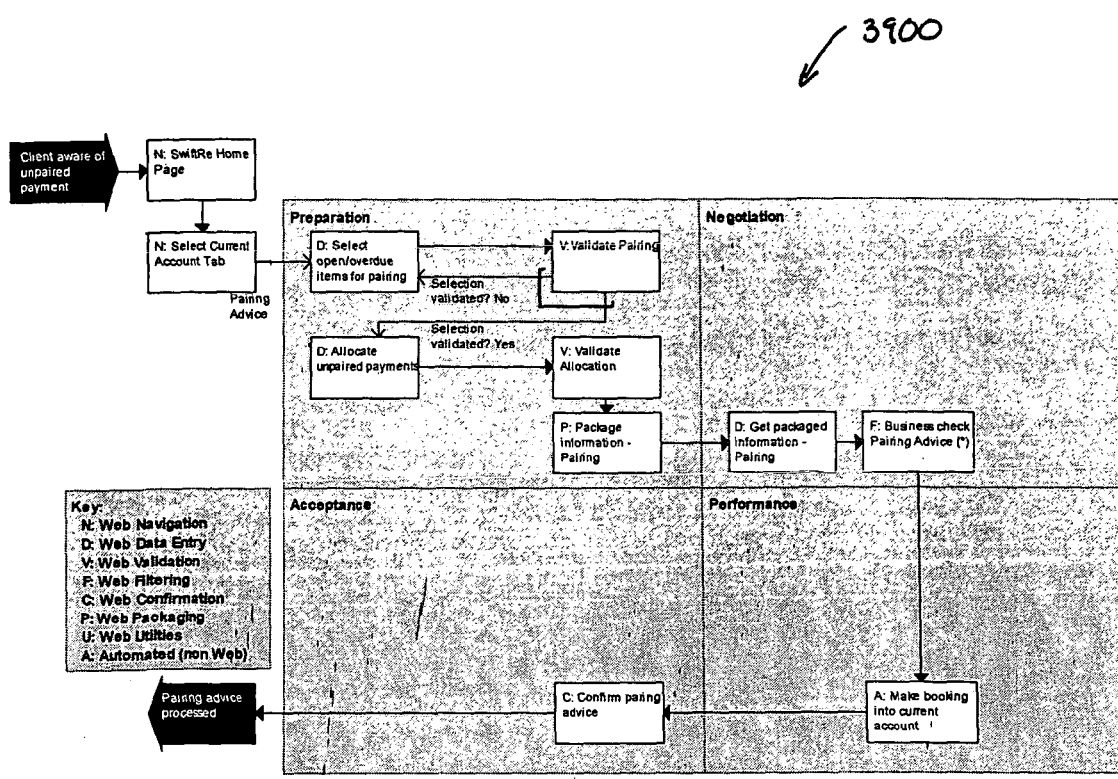
FIG. 39 shows an exemplary process through which a customer makes a payment request to a business.

In the back office context, FIG. 39 shows an exemplary process 3900 through which pairing advice may be processed by the business in a PNPA model.

Once a customer has accessed current account through the business supported interface and selected payment advice, the system proceeds to the "Preparation" portion of the PNPA model. The system obtains the information provided by the customer regarding the selected open or overdue items for pairing at "D: Select open/overdue items for pairing." The system validates the pairing at "V: Validate Pairing." If not validated, the system returns to "D: Select open/overdue items for pairing." If validated, the system requests the customer to allocate unpaired payments, either fully or partially, to the open/overdue items selected for pairing at "D: Allocate unpaired payments." The system validates the allocation at "V: Validate Allocation." If not validated, the system returns to "D: Allocate unpaired payments." If validated, the system proceeds to "P: Package information—Pairing." The "P: Package information—Pairing" contains information, such as, selected payments and selected open/overdue items. During the "Negotiation" portion of the PNPA model, the system receives the package information at "D: Get packaged information—Pairing." The information may optionally go through several checks at "F: Business check Pairing Advice." These checks are merely exemplary and if no checks are provided the system passes the information to the "Performance" portion of the PNPA model.

At "Performance" the system proceeds to "A: Make booking into current account." "A: Make booking (Payment)" causes the system to indicate in current account that the payments are paired and the open/overdue items are settled.

After making the booking into current account, the system seeks confirmation from the customer at "C: Confirm pairing advice." in the "Acceptance" portion of the PNPA model. Once the customer confirms, the system indicates "Pairing advice processed."

Each of FIGS. 37-39 provide keys indicating the nature of the processing that occurs at each step. It is understood that other processing means may be used without departing from the scope of the invention.

The exemplary systems and methods described above according to the present invention have many advantages. One such advantage is that the interaction between the customer and the business is automated. This automation reduces the costs and errors associated with non-automated processes, such as, for example, person-to-person communications. Furthermore, all transactions are electronically recorded, thus reducing the potential for miscommunication between live parties. Another advantage of this system is that a customer's balance can fluctuate day by day. One day the customer may owe the business and the next be entitled to the payment. This system provides full transparency for the client because he can see the daily values and use them to reconcile his accounts. Through the system described above, a customer can choose when it is best to act to make a payment or request payment because he is in full control of his accounts. This is beneficial to the business as well because they can rely on the customer's input, eliminate the need of manual entry, and minimize the amount of processing when payments from the customer are made or payments to the customer are required.

Another unique advantage of the systems and methods according to the present invention is their ability for rapid expansion. Although the present invention is presented with very specific examples of procedures that are most commonly encountered in the reinsurance business, the invention is not restricted to this type of business. Any business that could benefit from automating transactional encounters between the business and its customers would benefit from the use of this invention. The parameters, options and paths shown in the exemplary embodiments of the figures could be programmed to account for the specific requirements and unique business options of any other business.

In describing representative embodiments of the invention, the specification may have presented the method and/or process of the invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the invention should not be limited to the performance of their steps in the order written, and one skilled in the art can readily appreciate that the sequences may be varied and still remain within the spirit and scope of the invention.

The foregoing disclosure of the embodiments of the invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

What is claimed is:

1. A system for transacting business between a customer and a business, the system comprising:
    a server used by the business and being accessible by the customer, wherein the business is a reinsurer and the customer is an insurer; and
    a customer account stored on the server, the customer account having access to internal records of the reinsurer associated with the customer account on the server, wherein the server includes automated instructions that, when executed by the server, allow the customer to use a computer graphical user interface to offset a payment due to the reinsurer from the insurer with one or more payments due from the reinsurer to the insurer,
    wherein the automated instructions are adapted to present, on the computer graphical user interface for view and use by the customer, a list of debits indicating payments from the reinsurer to the insurer and credits indicating payments from the insurer to the reinsurer,
    wherein the debits and the credits are associated with more than one insurance policy between the insurer and the reinsurer, and wherein, a processor at the server uses the list of the debits and the credits to offset the payment due from the insurer to the reinsurer with the payment due from the reinsurer to the insurer.

2. The system of claim 1, wherein the payment due from the reinsurer to the insurer is for an insurance claim.

3. The system of claim 1, further comprising: a computer in communication with the server, wherein the customer accesses the server through the computer.

4. The system of claim 3, wherein the access to the server from the computer includes use of the Internet.

5. The system of claim 3, wherein the access to the server from the computer is remote.

6. The system of claim 1, wherein the customer advises of an upcoming payment by selecting a debit and a credit on the list, and wherein the automated instructions are adapted to verify that a sum of all selected debits and credits results in a net payment to the business.

7. The system of claim 1, wherein the customer requests a payment from the business by selecting a debit and a credit on the list, and wherein the automated instructions are adapted to verify that a sum of all selected debits and credits results in a net payment to the customer.

8. A system for transacting business between a customer and a business, the system comprising:
   a server used by the business and being accessible by the customer, wherein the business is a reinsurer and the customer is an insurer; and
   a customer account stored on the server, the customer account being configured to permit access to individual records associated with the customer account, the customer account having at least one associated process executable by the server,
   wherein the server includes automated instructions that are adapted to present, on a computer graphical user interface for view and use by the customer, a list of debits indicating payments from the reinsurer to the insurer and credits indicating payments from the insurer to the reinsurer,
   wherein the debits and credits are associated with more than one insurance policy between the insurer and the reinsurer, and
   wherein, a processor at the server uses the list of the debits and the credits to offset a payment due from the insurer to the reinsurer with a payment due from the reinsurer to the insurer.

9. The system of claim 8, wherein the payment due from the reinsurer to the insurer is for an insurance claim.

10. The system of claim 8, further comprising: a computer in communication with the server, wherein the customer accesses the server through the computer.

11. The system of claim 10, wherein the access to the server from the computer includes use of the Internet.

12. The system of claim 10, wherein the access to the server from the computer is remote.

13. A method of transacting business between a customer and a business, the method comprising:
   accessing, through a server used by the business, an existing customer account, including internal records of the business, wherein the business is a reinsurer and the customer is an insurer;
   accessing, through the server, a computer graphical user interface that displays a list of debits indicating payments from the reinsurer to the insurer and credits indicating payments from the insurer to the reinsurer, wherein the debits and the credits are associated with more than one insurance policy, and
   using the list of the debits and the credits to instruct the server, through a computer communicatively coupled to the server, to offset a payment due from the insurer to the reinsurer with a payment due from the reinsurer to the insurer.

14. The method of claim 13, wherein the payment due from the reinsurer to the insurer is for an insurance claim.

15. The method of claim 13, wherein accessing the customer account involves use of the Internet.

16. The method of claim 13, wherein the customer account is accessed remotely.

* * * * *